(12) United States Patent
Quist et al.

(10) Patent No.: US 6,199,018 B1
(45) Date of Patent: Mar. 6, 2001

(54) DISTRIBUTED DIAGNOSTIC SYSTEM

(75) Inventors: Nancy L. Quist, Bloomington, MN (US); Austin H. Bonnett, Chesterfield, MO (US); James P. Lynch, Grand Island, NY (US); Joseph A. Kline, Sr., St. Charles, MO (US); Michael I. Henderson; Ronald Ivar Hannula, Jr., both of Florissant, MO (US); Thomas W. Grudkowski, Chesterfield, MO (US); Vojislav Divljakovic, Creve, MO (US); George William Buckley, Fond du Lac, WI (US); Robert P. Bauer, Chesterfield, MO (US); Israel E. Alguindigue, Minneapolis, MN (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/034,767

(22) Filed: Mar. 4, 1998

(51) Int. Cl.$^7$ .................................................. G01R 23/00
(52) U.S. Cl. ........................... 702/34; 702/181; 706/20; 706/912; 318/806
(58) Field of Search .............................. 702/34, 181, 182, 702/183, 56, 54; 706/20, 912; 318/806; 700/286

(56) References Cited

U.S. PATENT DOCUMENTS

| | | | |
|---|---|---|---|
| 4,470,092 | 9/1984 | Lombardi | 361/23 |
| 4,525,763 | 6/1985 | Hardy et al. | 361/24 |
| 4,659,976 | 4/1987 | Johanson | 318/332 |
| 4,761,703 | 8/1988 | Kliman et al. | 361/23 |
| 4,839,830 | 6/1989 | Amey et al. | 364/551.01 |

(List continued on next page.)

FOREIGN PATENT DOCUMENTS 2 681 942   4/1993   (FR) .

OTHER PUBLICATIONS

IQ Prealert Intelligent Monitoring To Extend The Productive Life Of 21st Century Motor–Dependent Processes, Rockwell Automation, © 1996 by Reliance Electric Industrial Co., Cleveland, OH.

IQ Intelligent AC Motors With Prealert Technology "The World's First Truly Intelligent Motor", Rockwell Automation, © 1997 by Reliance Electric Industrial Co., Cleveland, OH.

IQ Pre–Alert Overview, Rockwell Automation, Sep. 10, 1997 by Reliance Electric Industrial Co., Cleveland, OH.

Intelligent Motor Technology, Rockwell Automation, May 8, 1997 by Reliance Electric Industrial Co., Cleveland, OH.

Thomas G. Habetler, "On–Line Mechanical Fault Detection In Induction Machines Using Stator Current Monitoring," IEEE IAS '95 Tutorial, Oct. 8, 1995, Atlanta, GA.

Jonathan D. Gardell, "Las Motor Condition Monitoring Tutorial," Electrical Machines Committee IAS Annual Meeting, Conventional Motor Protection Systems, Oct. 6, 1996, San Diego, CA.

(List continued on next page.)

*Primary Examiner*—Kamini Shah
(74) *Attorney, Agent, or Firm*—Luedeka, Neely & Graham, P.C.

(57) ABSTRACT

A distributed diagnostic system in which a plurality of local monitoring devices collect local information concerning various machines and process that information, according to redefined diagnostic parameters, for diagnostic purposes. The local information collected by the plurality of local monitoring devices is provided to a global processor that globally processes the collected information to provide updated diagnostic parameters to the local monitoring devices.

18 Claims, 21 Drawing Sheets

U.S. PATENT DOCUMENTS

| | | | |
|---|---|---|---|
| 5,019,760 | 5/1991 | Chu et al. | 318/490 |
| 5,189,350 | 2/1993 | Mallett | 318/434 |
| 5,323,325 | 6/1994 | Izumiya | 364/474.16 |
| 5,485,491 | 1/1996 | Salnick et al. | 376/245 |
| 5,530,343 | 6/1996 | Bowers, III et al. | 324/173 |
| 5,576,632 | 11/1996 | Petsche et al. | 324/772 |
| 5,629,870 | 5/1997 | Farag et al. | 364/551.01 |
| 5,631,839 | 5/1997 | Lemoine | 364/468 |
| 5,680,025 | 10/1997 | Bowers, III et al. | 318/806 |
| 5,710,723 | 1/1998 | Hoth et al. | 364/551 |
| 5,726,911 | 3/1998 | Canada et al. | 364/550 |
| 5,744,723 | 4/1998 | Piety | 73/660 |

OTHER PUBLICATIONS

Alexej Barkov and Natalja Barkova, "Condition Assessment and Life Prediction of Rolling Elements Bearings—Part 2," pp. 27–31, Sound and Vibrations, Sep. 1995.

S. F. Farag and Mike Jhaveri, "Intelligent Microprocessor Based Devices Provide Advanced Motor Protection, Flexible Control, and Communication in Paper Mills", pp. 1–9, May 31, 1996.

G.B. Kliman, W.J. Premerlani, R.A. Koegl & D. Hoeweler, "A New Approach to On–Line Turn Fault Detection in AC Motor," pp. 687–693, IEEE, 1966.

B.R. Upadhyaya, J.E. Banks, "Advanced Maintenance Technology," pp. 37–41, P/PM Technology, Apr. 1996.

B.A. Lloyd, G.C. Stone and J. Stein, "Motor Insulation Condition Assessment Using Expert Systems Software," pp. 60–67, IEEE, 1994.

Bekir Karlik and Kayhan Gulez, "The Performance Analysis of Induction Motors With Artificial Neural Networks," pp. 1452–1455, IEEE, 1995.

Mark M. Hodowanec, "Considerations of Coupling Selection, Installation and Alignment: Effects on Motor Mechanical Performance," pp. 122–131, IEEE, 1996.

Michael Babb, "Motor Overload Protection Becomes 'Communications–Capable'," pp. 69–72, Control Engineering, Jun. 1996.

Stanislaw F. Legowski, A.H.M. Sandrul Ula and Andrzej M. Trzynadlowski, "Instantaneous Power as a Medium for the Signature Analysis of Induction Motors," pp. 904–909, IEEE, 1996.

B.R. Upadhyaya, E.M. Katz and T.W. Kerlin, "Power Plant Dynamics, Control & Testing Symposium Proceedings," pp. 76.01–76.10, The University of Tennessee, Knoxville, Tennessee, May 24–26, 1995.

Hugh Hollowood, "Reduce Motor Failure Management Program With Comprehensive,", pp. 30–32, PIMA, Nov. 1998.

Stanislaw F. Legowski, A.H.M. Sadrul Ula and Andrzej M.Trzynadlowski, "Instantaneous Stator Power As A Medium For The Signature Analysis Of Induction Motors," pp. 619–624, IEEE, 1995.

Leslie Langnau, "Sensors Help You Get Maximum Use From Your Motors," pp. 47–50, Power Transmission Design, Sep. 1997.

Motorstatus, Integrated Smart Sensors' For Monitoring AC Induction Motors, Status Technologies, A subsidiary of CSI, Knoxville, Tennessee, Brochure 1997.

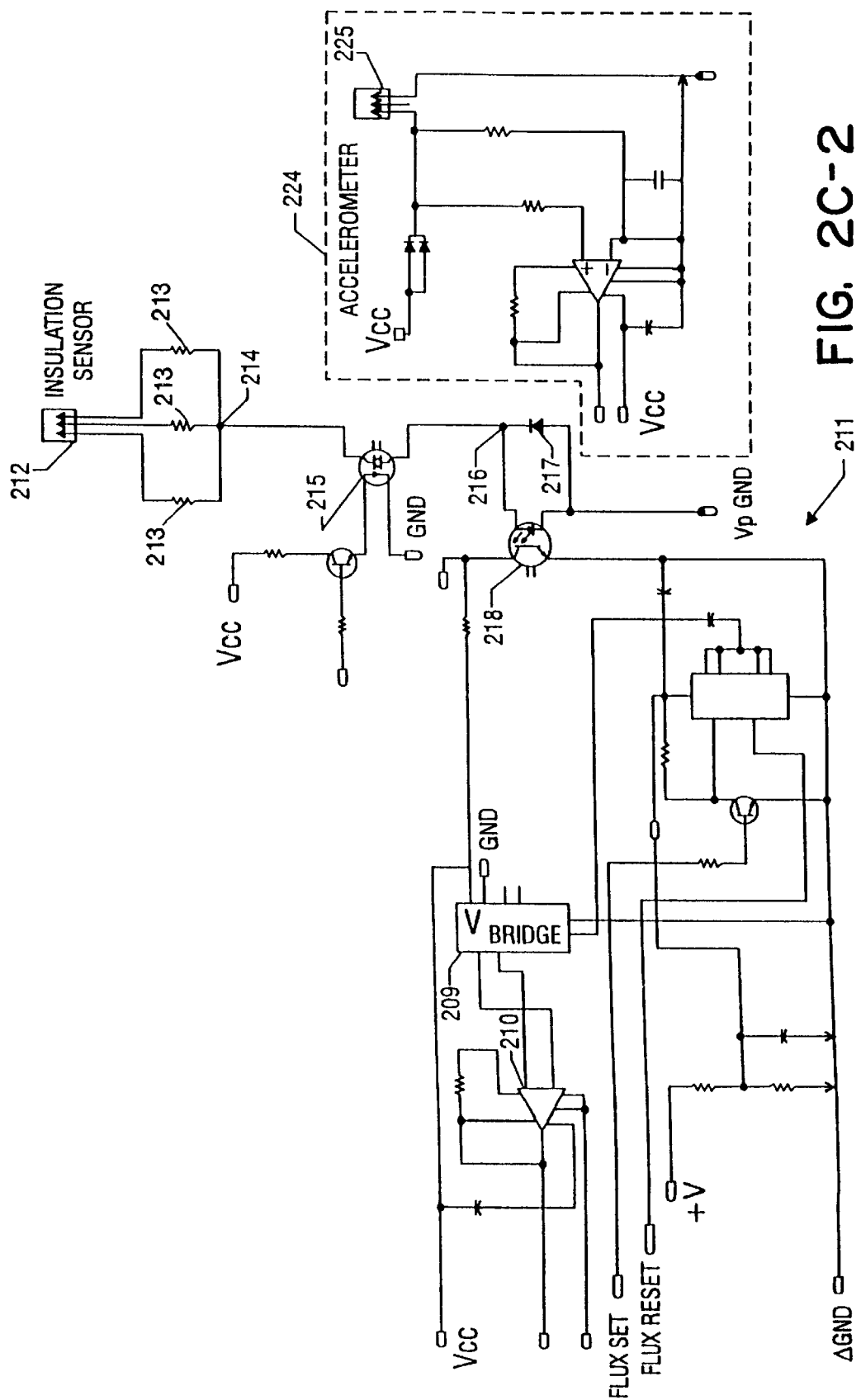

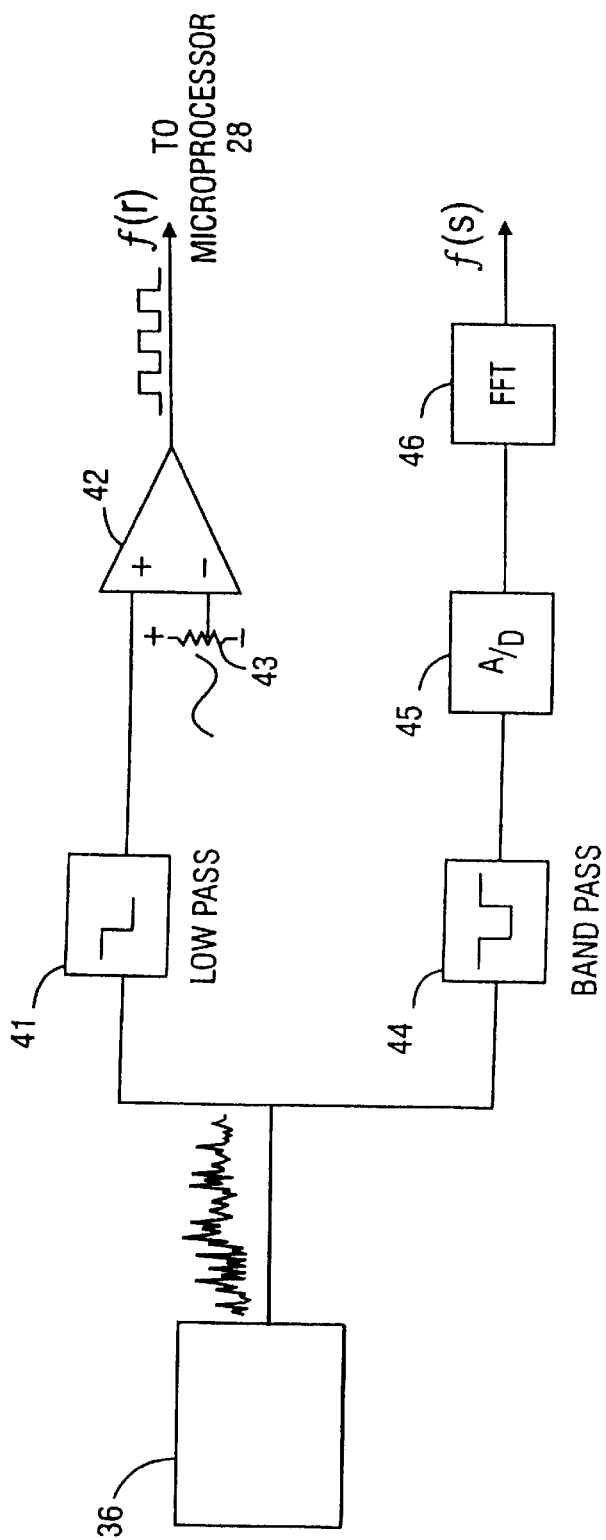
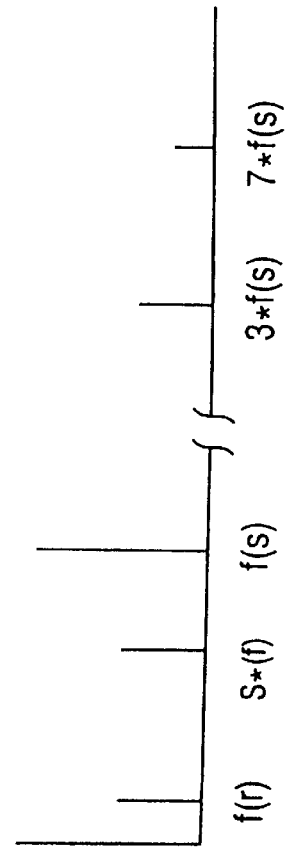
FIG. 4
FIG. 5

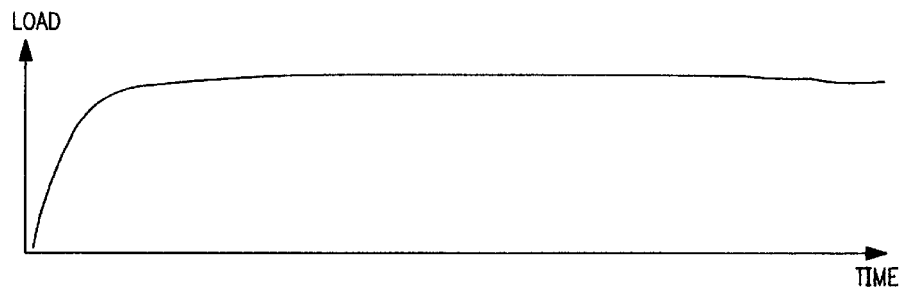
FIG. IIA
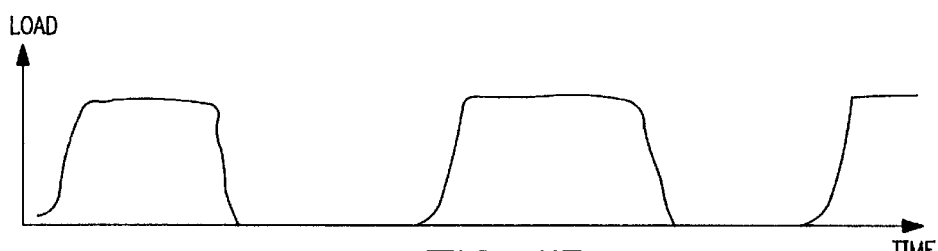
FIG. IIB
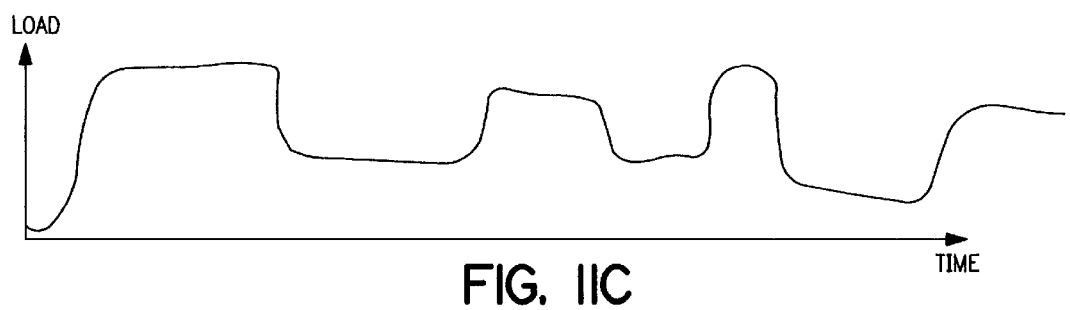
FIG. IIC

DISTRIBUTED DIAGNOSTIC SYSTEM

FIELD OF THE INVENTION

The present invention relates to systems and methods for diagnosing machines and, in particular, to systems and methods for predicting the expected lifetime for and the failure of rotating machines.

BACKGROUND OF THE INVENTION

Presently, many industrial process and operations depend on the proper and continued operation of machines and, in particular, on the proper and continued operation of rotating machines such as motors. The number of such rotating machines in operation today is significant. For example, some have estimated that approximately 70% of all of the electricity produced in this country goes to power rotating machines. Further, the proper operation of such machines can have a significant economic impact on the operation of industrial plants as the failure of a key machine, for even a short time period, can cause an entire assembly line to come to a halt. In certain industries, for example the paper mill industry, typical motor failure can result in costs in excess of $20,000 per hour when the motor is down.

In an effort to ensure reliable and continued operation of such machines, and to avoid unexpected failures, many have attempted to employ non-intrusive diagnostic or monitoring methods or systems to locally monitor such machines in an effort to determine and, ideally, predict machine failure. One goal of such systems and methods is to allow their users to identify potential problems at an early stage and either take steps to avoid the potential problem or replace the suspect machinery.

Despite the widespread interest in diagnostic systems as described above, a practical, reliable, low cost and convenient diagnostic system for machines in an industrial environment has not yet been developed. This is especially true with respect to rotating machines such as motors, where the absence of an effective, low-cost diagnostic system or method of diagnosing motor health and life prediction is noticeable.

Prior art attempts to develop effective motor diagnostic systems and methods have been limited. The vast majority of such systems simply locally monitor a specific machine according to a fixed monitoring process to determine whether it is operating within a "fault state" (i.e., a limited, predefined operating state) or a "no-fault state." These systems, while providing some slight advance warning before a machine fails, do not provide information of the type that may be readily used for preventative maintenance or for scheduled replacement of certain machines. Also, the local monitoring processes used in such systems typically are derived from laboratory tests on related machines and are, thus, not highly accurate in field situations.

In addition to the above, many known motor diagnostic systems and methods require the use of complicated, space-requiring, and expensive detectors and/or transducers for proper operation. For example, when dealing with variable speed motors, one of the key parameters often used in known systems is the rotational speed of the rotor. Often, the rotational speed is determined through the use of an encoder or other similar device which includes a rotating member coupled to the rotor of the motor and a stationary member that is coupled the stator and that interacts with the rotating member to produce an output signal representative of the rotational speed of the rotor. The components required by such encoders often require space that could otherwise be effectively used, result in increased motor costs, and are subject to failure and/or breakage. Accordingly, many known diagnostic systems are necessarily limited because of their dependence on such speed-sensing devices.

It is an object of the present invention to overcome these, and other limitations of the prior art. Other objects of the present invention will be apparent to those of ordinary skill in the art having the benefit of this disclosure.

SUMMARY OF THE INVENTION

In accordance with one exemplary embodiment of the present invention, a distributive diagnostic system is provided for monitoring a plurality of machines where the system includes a plurality of local monitoring devices, where each local monitoring device is adapted to receive local data concerning at least one machine associated with the local monitoring device, and where each local monitoring device further includes a data processor adapted to: (i) communicate the local data concerning its associated machine and (ii) analyze the local data concerning its associated machine using a set of provided parameters for local diagnostics of the machine. The exemplary system also includes a global data processor coupled to the plurality of local monitoring devices, where the global data processor is adapted to receive from each local monitoring device the local data concerning its associated machine and where, in response to the local data from the plurality of local monitoring devices, the global data processor generates the set of provided parameters for each local monitoring device.

Other exemplary embodiments of the present invention and other features of the present invention will be apparent to one of ordinary skill in the art having the benefit of this disclosure.

BRIEF DESCRIPTION OF THE DRAWINGS

FIG. 4 illustrates a novel circuit for determining the slip of an induction machine using a flux sensor in accordance with certain aspects of the present invention.

FIG. 5 generally illustrates the frequency spectrum that may be obtained through appropriate processing of the digital signals corresponding to the output of a flux sensor in accordance with certain aspects of the present invention.

FIGS. 11A–11C illustrate the types of loads often encountered by electric machines.

DETAILED DESCRIPTION OF THE INVENTION

Figure 1:
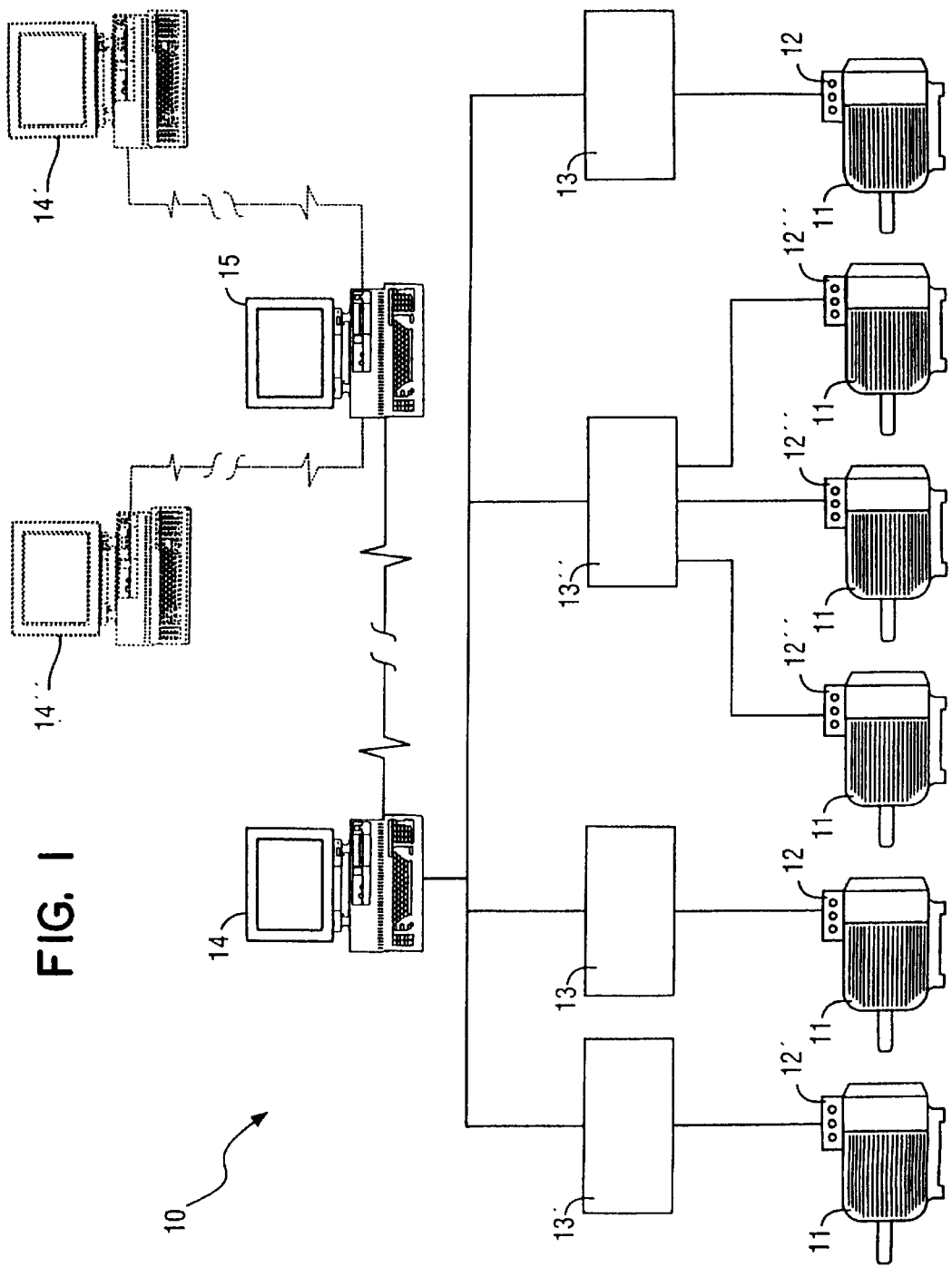
FIG. 1 illustrates an exemplary distributed diagnostic control system constructed in accordance with certain aspects of the present invention.

Turning to the drawings and, in particular, to FIG. 1, an exemplary distributed diagnostic system 10 constructed in accordance with certain aspects of the present invention is illustrated. In general, the exemplary distributed diagnostic system 10 includes a plurality of machines 11, where each machine is associated with and coupled to a local monitoring device 12. In the exemplary system of FIG. 1, each of the machines 11 is represented as a conventional induction motor, although the present invention is applicable to other forms of machines such as brushless DC machines, switched reluctance machines, and the like.

Each of the local monitoring devices 12 collects information concerning the operational status of the machine 11 with which it is associated. For example, each local monitoring device 12 may collect information concerning the vibrational characteristics of the machine 11, the temperature of the stator, windings and/or bearings of the machine 11, and the flux established in the stator and rotor. This information may be stored in data storage elements (not illustrated) positioned in the local monitoring devices 12.

The collected information concerning the various machines 11 is processed by each local monitoring device 12 to produce a low-level indication reflecting the operational status of its associated machine 11. This low-level indication may take the form of a visual indicator of motor health that will provide a green indicator if the motor is operating properly, a yellow indicator if the motor appears to be in a near-failing mode, and red indicator of the motor is failing or has failed. The local monitoring devices 12 may also pre-process some or all of the collected information for external communication and later processing as described more fully below.

In one embodiment, each of the local monitoring devices includes a microcontroller or microprocessor (not illustrated in FIG. 1) that runs software establishing a local, low-level, pattern recognition model that receives the collected information and, using the local model, locally predicts the "health" of the motor. In this embodiment, the parameters that define the local model may be downloaded to the local monitoring devices 12 as more fully described below.

In the embodiment of FIG. 1, each of the local monitoring devices 12 is adapted to provide all or some of the collected information and all or some of the processed information reflecting the operating condition of its associated machine 11 to a protocol translator 13. As reflected in FIG. 1, various arrangements are possible wherein only a single local monitoring device 12' is coupled to a single protocol translator 13' or where multiple local monitoring devices 12" are coupled to a single protocol translator 13".

Alternate versions of the protocol translator 13 may be used in the system of FIG. 1. In one embodiment, the protocol translators 13 simply receive information from the local monitoring devices 12 using one communications protocol and converts the information such that it can be transmitted to a site processor 14 using a second communications protocol. In a second embodiment, the protocol translator 13 has some "intelligence" and periodically polls and collects information from the local monitoring device 12 to which it is coupled. The construction of either described protocol converter 13 will be well within the ability of one of ordinary skill in the art having the benefit of this disclosure.

Referring to the example of FIG. 1, all of the protocol translators 13 are coupled to communicate with a site processor 14, which in the exemplary system is a personal computer. The site processor 14 receives and processes the collected information from the local monitoring devices 12 via the protocol translators 13. In embodiments where the site processor 14 is capable of receiving information using the same communications protocol utilized by the remote monitoring devices 12, the protocol translator 13 may be eliminated.

In one embodiment of the present invention, the site processor 14 is a computer running a global diagnostic program that constantly receives the collected information generated by the local monitoring devices and generates information concerning the likely failure of the various machines. The site processor may use this information to provide an indication of likely machine failure and/or to initiate machine shutdown or other corrective action.

In a further embodiment, the site processor 14 is a personal computer that is running a global neural network program that receives as its inputs the information from the local monitoring devices 12 and provides as outputs information representative of the operating characteristics of the various machines 11. As explained more fully below, these inputs and outputs may be used to derive the parameters used by the local monitoring devices 12 to establish the local models used by the local monitoring devices 12 for diagnostic purposes.

The global diagnostic program running on the personal computer 14 may include a self-correcting algorithm, such as a neural network, that receives information from the local monitoring devices 12 via the protocol translators 13 and uses that information to develop an updatable statistical model that can provide useful information concerning the operating condition and failure potential of the various motors 11. Since the global program running on the site processor is adaptive it can "learn" from the information provided to it from the local monitoring devices 12 and can build one or more global neural networks that can predict motor operating conditions and failure with greater precision as more and more information is provided to the global neural network programs from the various local monitoring devices 12.

The use of the adaptive program running on the site processor 14 allows the program to receive and analyze information concerning the operation and failure of the machines 11 at a particular site. Accordingly, while the adaptive program may be initially "seeded" with basic information concerning likely motor operation and failure for the machines 11, it can adapt that information, by adjusting the parameters of the global neural network, to the particular operating conditions of the site. Further, the personal computer 14 can periodically download some or all of the parameters of the neural network to the local monitoring devices 12 for the local monitoring devices to use the updated parameters to locally determine the operating conditions of the machines 11 associated with the local monitoring devices.

In one embodiment, the site processor 14, in addition to maintaining the global, adaptive, neural network described above, also performs "high" level processing of the information provided by the local monitoring devices 12. Such high level processing may provide specific information about individual motors such as: expected lifetime, expected time to failure, and desired maintenance operations. The results of this high level processing may be provided to a human user of the system through the screen of the personal computer 14 or through some form of "alarm" indicators which would likely draw the attention of a human operator to a potential or actual motor failure. In addition the personal computer 14 may monitor the information from the protocol converters 13 to provide "trend" information concerning a specific machine 11 or a group of machines.

In a further embodiment of the present invention, one or all of the local monitoring devices 12 is programmed to run a low level adaptive program similar to the higher level adaptive program running on the site processor 14. In this embodiment, the local adaptive program running in such local monitoring device 12 will receive measured information concerning the machine 11 to which it attached and use that information to update the parameters of its particular adaptive program. Some or all of the local parameters generated by these local monitoring devices 12 will then be communicated to the personal computer 14 which can use these local parameters to generate "site-wide" updated parameters for feedback to the local monitoring devices 12. In this embodiment, each "intelligent" local monitoring device 12 can learn from its own motor and receive information derived from an analysis of all of the motors that communicate with the personal computer.

As the above indicates, the system of FIG. 1 represents a distributed, multi-layered, diagnostic system in which a global self-correcting predictive algorithm running on site processor 14 operates on information locally acquired by the local monitoring devices 12 to determine and predict machine operation and failure. In sum, site processor 14 provides a self-correcting predictive algorithm based on the collection of a number of similar motors working under similar environmental and load conditions.

The "site" system disclosed above may be expanded by allowing the site processor 14 to communicate data, via a modem line or a direct communications connection, to a centralized database 15. The data may be transferred using disk or tape, if necessary.

In the example of FIG. 1, the centralized processor 15 represents a centralized processor running a "super-global" adaptive program that, receives information from the site processor 14, as well as information from similar site processors 14' and 14" operating in sites different from that of site processor 14. For example, site processor 14 could be a processor running in one portion of an industrial plant, while site processors 14' and 14" operate in different portions of the same plant. Alternately, site processor 14 could operate in one industrial plant, with site processors 14' and 14" operating in different industrial plants or in different parts of a given country. In either embodiment, the centralized processor 15 receives the parameters from the global predictive algorithms running on the site processors 14, 14' and 14" and uses that information to generate updated parameters that reflect all of the information received from all of the site processors 14, 14' and 14". These updated centralized parameters, may be stored in a centralized database and feed back to the various site processors 14, 14' and 14", which in turn may provide the parameters to the appropriate local monitoring devices 12 for use in determining and predicting the operation and failure of the machines 11 associated with the local monitoring devices.

As will be apparent to those of ordinary skill in the art having the benefit of this disclosure the system of FIG. 1, including the centralized processor 15, provides a distributed, multi-level diagnostic and monitoring system in which several self-collecting predictive algorithms run based on information and parameters derived from the comparison of locally acquired information with statistical data collected in centralized database maintained by central processor 15. Thus, the system of FIG. 1 provides a useful system capable of providing information useful for the monitoring and preventative maintenance of electric machines and, in particular, electric motors. Through the use of centralized processor 15 information may be shared plant or industry wide for more effective machine diagnostics.

Those of ordinary skill in the art will appreciate that the general system of FIG. 1 is but one exemplary system utilizing certain aspects of the present invention. For example, the number of machines 11, local monitoring devices 12 and site processors 14 feeding into the centralized processor 15 may be changed without departing from the present teachings. Further, while the various devices of FIG. 1 communicate over hardwired lines, it will be appreciated that wireless communication devices and/or a combination of wireless and hardwired communications may be used without departing from the present invention.

Various details of the components of the system of FIG. 1, and alternate embodiments of such components, are provided below.

FIGS. 2A–2E illustrate in greater detail an exemplary machine 11 and a local monitoring device 12 of the type illustrated in FIG. 1. In this example, the machine 11 is a squirrel-cage induction machine of the type available from U.S. Electrical Motors or the Emerson Electric Co.

Figure 2A:
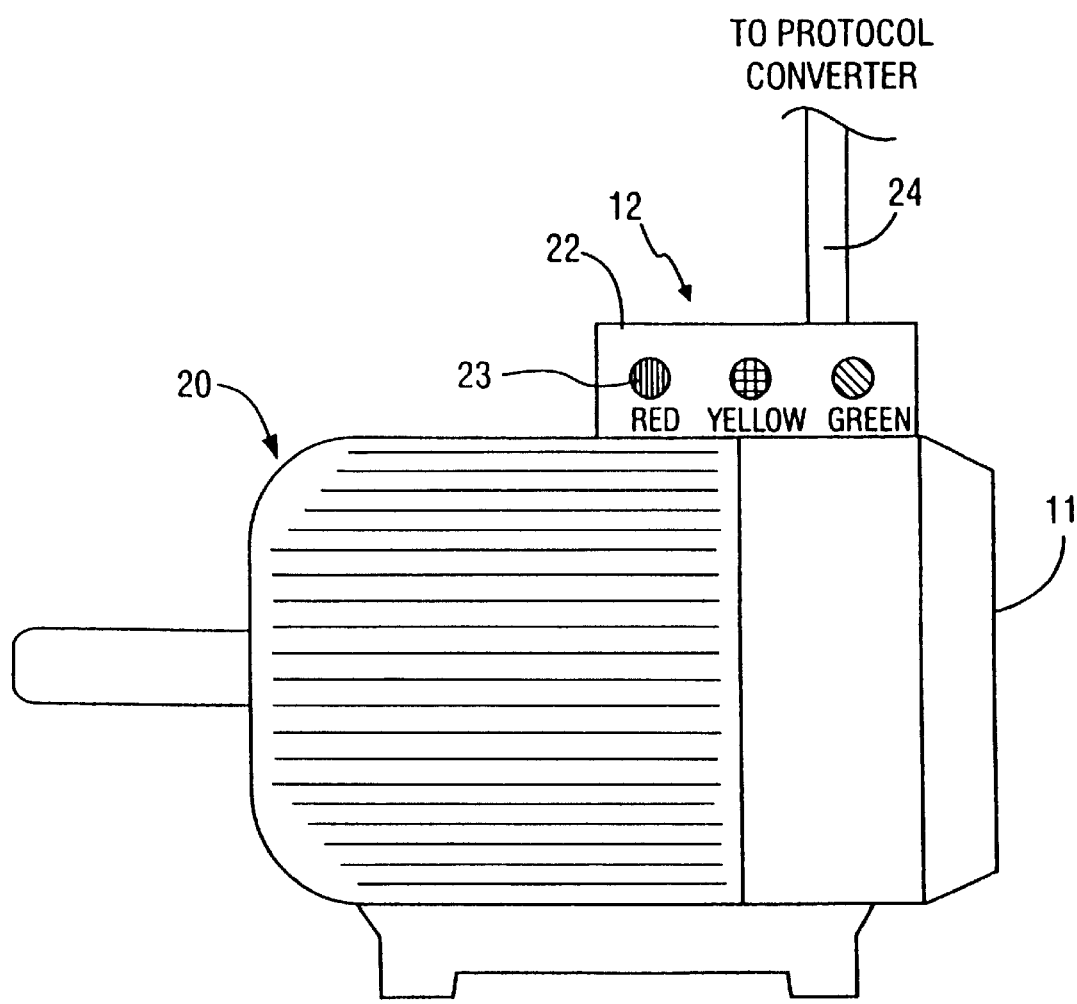
FIGS. 2A–2E illustrate in greater detail an exemplary machine and a local monitoring device of the type illustrated in FIG. 1.

Turning to FIG. 2A, the machine 11 includes a rotating member referred to as a rotor and an outer stationary member referred to as a stator (not illustrated). Both the rotor and the stator are contained in a motor housing 20. The machine 11 may be of conventional construction.

Coupled to the motor housing 20 is a local monitoring device 12. In the example of FIG. 2A, the local monitoring device 12 comprises one or more electronic boards (not illustrated in FIG. 2A) coupled to several sensors affixed to the machine 11. The electronic boards are positioned within a device housing 22 that is coupled to the motor housing 20. Alternate embodiments are envisioned wherein the local monitoring device 12 is not directly connected to the machine 11 but is, instead, positioned at a different location. In embodiments where the local monitoring device 12 coupled directly to the machine 11, the device housing 22 should be capable of protecting its contents from the expected thermal and environmental conditions in which the machine 11 will operate.

In the example of FIG. 2A, the device housing 22 supports visual indicators 23. In the illustrated embodiment, the visual indicators comprise three lights (red, yellow, and green) which provide local visual indications of the operating condition of the machine 11 as described above. The controls for the visual indicators 23 are provided by the electronics on the electronic control boards of the local monitoring device 12. Alternate embodiments are envisioned wherein other forms of indicator (e.g., audible) or visual indicators with more or less than three lights are used.

A communications link 24 extends from the local monitoring device 12 to allow the local monitoring device 12 to communicate and receive information and data from outside sources. The nature of the communication link 24 will vary depending on the communication scheme employed by the local monitoring device 12. For example, the communication link 24 may comprise co-axial cable, twisted wire cable or optical fiber, depending on the communication scheme utilized by the local monitoring device 12.

Figure 2B:
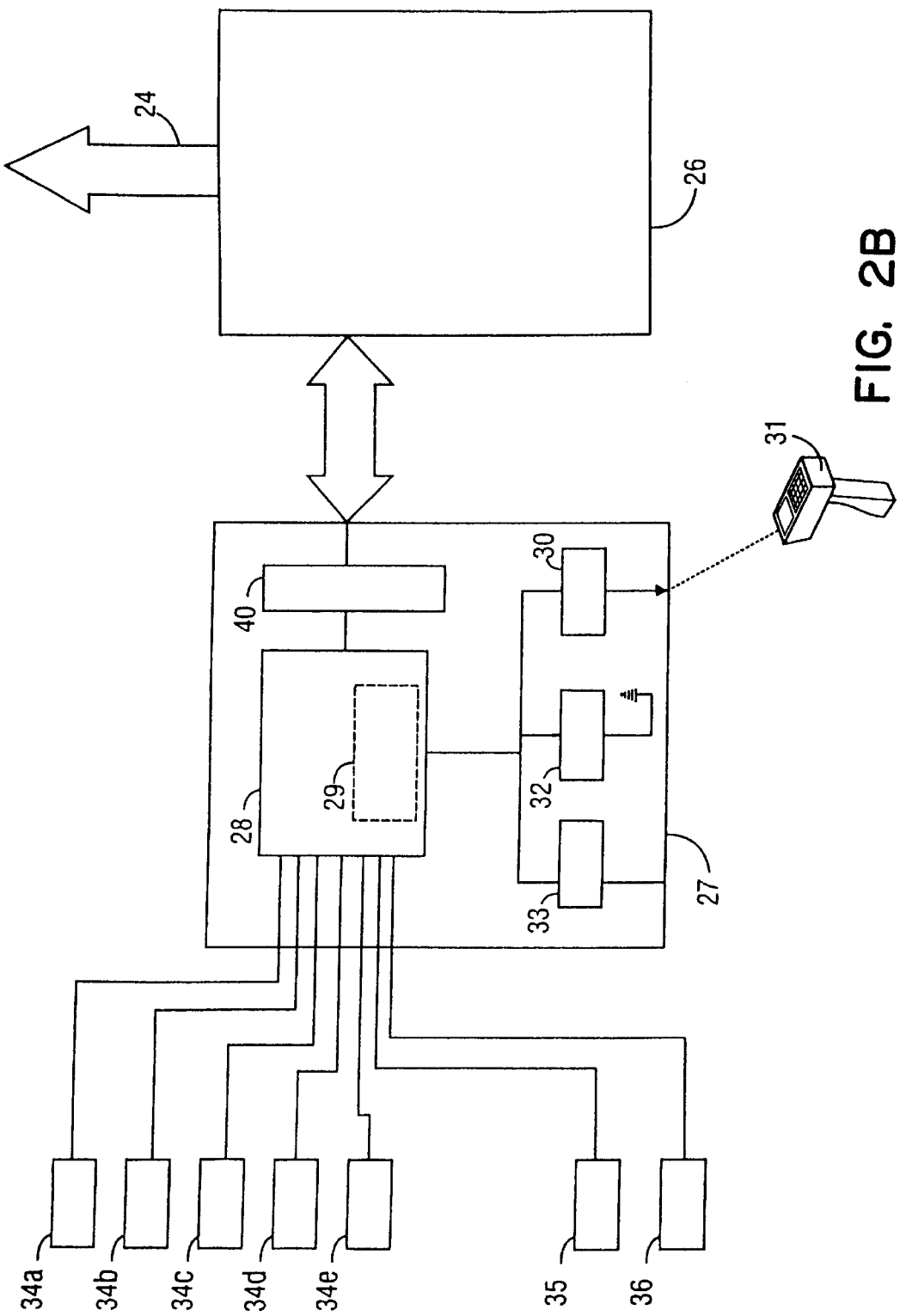

FIG. 2B illustrates in greater detail the electronics control boards housed in the device housing 22.

In general the electronics control boards housed in the device housing 22 include a communications board 26, such as a CT Network Communications Board, that is adapted to communicate (i.e., transmit and receive) information and data over an appropriate communications link 24. In the example of FIG. 2B, the communications board 26 is coupled to the communications link 24 such that information can be communicated over the information link. The communications board 26 should include appropriate hardware, software and/or firmware to allow the communications board 26 to receive and transmit information according to one or more appropriate protocols. For example, the communications board 26 may be adapted to communicate using wireless communication techniques, or using standard communication protocols such as the HART, CT Net, Modbus+, Fieldbus or other similar protocols. In the exemplary embodiment of FIG. 2B, the communications board 26 is also adapted to control the visual indicators 23.

The communications board 26 may be constructed and configured using known devices and techniques and the appropriate construction of such a board will be apparent to those of ordinary skill in the art having the benefit of this disclosure.

Coupled to the communications board 26 is a main control board 27 that, in the exemplary embodiment of FIG. 2A, includes a microprocessor or microcontroller 28 and a first data storage device 29. In one embodiment, the microprocessor 28 is a Motorola MC68LC302, HC11 or HC05 type processor and the data storage device 29 comprises flash memory, such as a flash memory device contained within the microprocessor 28 or an external flash memory device such as an AT29C256FLASH part. Other external memory devices, such as EPROM and DRAM devices may be used in conjunction with the microprocessor to implement the system described herein. The construction of the main control board 27 and the selection of the appropriate external memory devices will be apparent to one of ordinary skill in the art having the benefit of this disclosure.

A standard modem device 30, such as an RS-485 modem, is also coupled to the microprocessor 28 such that the microprocessor can communicate over the modem device 30. As discussed in more detail below, the microprocessor 28 may use the modem device 30 to communicate with a number of different instruments including a hand-held data logger/transmitter 31. In the exemplary embodiment of FIG. 2B, additional communication devices are provided to allow the microprocessor 28 to communicate data and information. Specifically, a RF transceiver 32 is provided to allow for "wireless" communications and a HART ASIC 33 or other appropriate device (e.g., a FR 3244 transmitter) is provided to allow for the microprocessor to communicate using the HART protocol. Those of ordinary skill in the art will appreciate that the communication devices 30, 32 and 33 are only examples of the types of communication devices that may be used with microprocessor 28 and that other devices (and other combinations of devices) maybe used. Embodiments are also envisioned wherein communication devices such as devices 30, 32 and 33, are eliminated and all microprocessor communications are accomplished through the CT protocol board.

In certain embodiments a dual-port memory device 40 (e.g., a dual port RAM) may be positioned between the microprocessor 28 and the various devices used by the microprocessor for communications. FIG. 2B illustrates the use of such a device 40 in the communications link between the microprocessor 28 and the control board 26.

As reflected in FIG. 2B, the microprocessor 28 is adapted to receive as inputs information provided from a sensor set that is adapted to sense various operating parameters of the machine 11. FIG. 2B illustrates one such exemplary sensor set including seven sensors: 34a–34e, 35 and 36.

Sensors 34a–34e are RTD transducers that are positioned appropriately with respect to the machine 11. In one embodiment, two of the RTD transducers 34a–34e are positioned near two bearing devices positioned within machine 11 and the other RTD transducers are positioned to detect the temperature of the windings of machine 11, the temperature of the machine housing, and/or the temperature of the environment in which machine 11 is operating. The precise placement and use of such RTD temperature sensors will vary from application to application and those of ordinary skill in the art will appreciate that fewer or more than five RTD transducers may be used to implement the teachings contained herein. Also, those of ordinary skill in the art will appreciate that temperature detection devices other than RTD transducers may be used to detect and provide information concerning the temperature of machine 11, its bearings, housing and/or environment.

In the embodiment of FIG. 2B, the microprocessor 28 includes a plurality of built-in A/D converters and each of the RTD transducers 34a–34e comprises a RTD device and an amplifier (not illustrated in FIG. 2B) that receives the output of the RTD device and conditions the signal such that the output of the amplifier is an analog signal within the range acceptable by the appropriate A/D converter of the microprocessor 28. In embodiments where a microprocessor 28 not having built-in A/D capabilities is utilized a separate A/D converter, and possibly separate communications devices, may be coupled between the RTD transducers 34a–34e and the microprocessor 28.

In addition to the five RTD transducers 34a–34e, the microprocessor 28 also receives as an input the output signals from a vibration sensor 35 that, in the embodiment of FIG. 2B, includes a vibration detector coupled to an amplifier for proper conditioning of the vibration signal in a manner similar to the conditioning associated with the RTD transducers discussed above. The vibration sensor 35 may be positioned with respect to machine 11 to detect mechanical vibrations (or the absence of such vibrations) from the machine 11 that are induced when the machine 11 is running and/or at rest. In one embodiment, the vibration detector 35 comprises an accelerometer, such an automotive accelerometer available from various manufactures including Motorola.

In the embodiment of FIG. 2B, the microprocessor 28 also receives as an input the output signals from an electromagnetic flux sensor 36 that includes a flux sensing device and a conditioning amplifier. In general the flux sensor 36 should be positioned appropriately with respect to the associated machine 11 to detect the magnitude of the flux existing in the stator of machine 11. As explained more fully below, the flux sensor 36 allows for a determination of, among other things, the rotor speed and the load of machine 11 for use in the normalization of the temperature and vibration information provided by sensors 34a–34e and sensor 35.

The selection, construction, and positioning of sensors 34a–34e, 35 and 36, and the coupling of such sensors to microprocessor 28, will be apparent to those of ordinary skill in the art having the benefit of this disclosure. In general, the number, type and positioning of the sensors should provide enough information for reliable prediction of machine failure when combined with the statistical life data of similar machines. Sensors other than those discussed above may be used without departing from the teachings herein. For example, other sensor types (e.g., current and/or voltage sensors) may be added or substituted as required for reliability or cost optimization.

Figures 1, 2C:
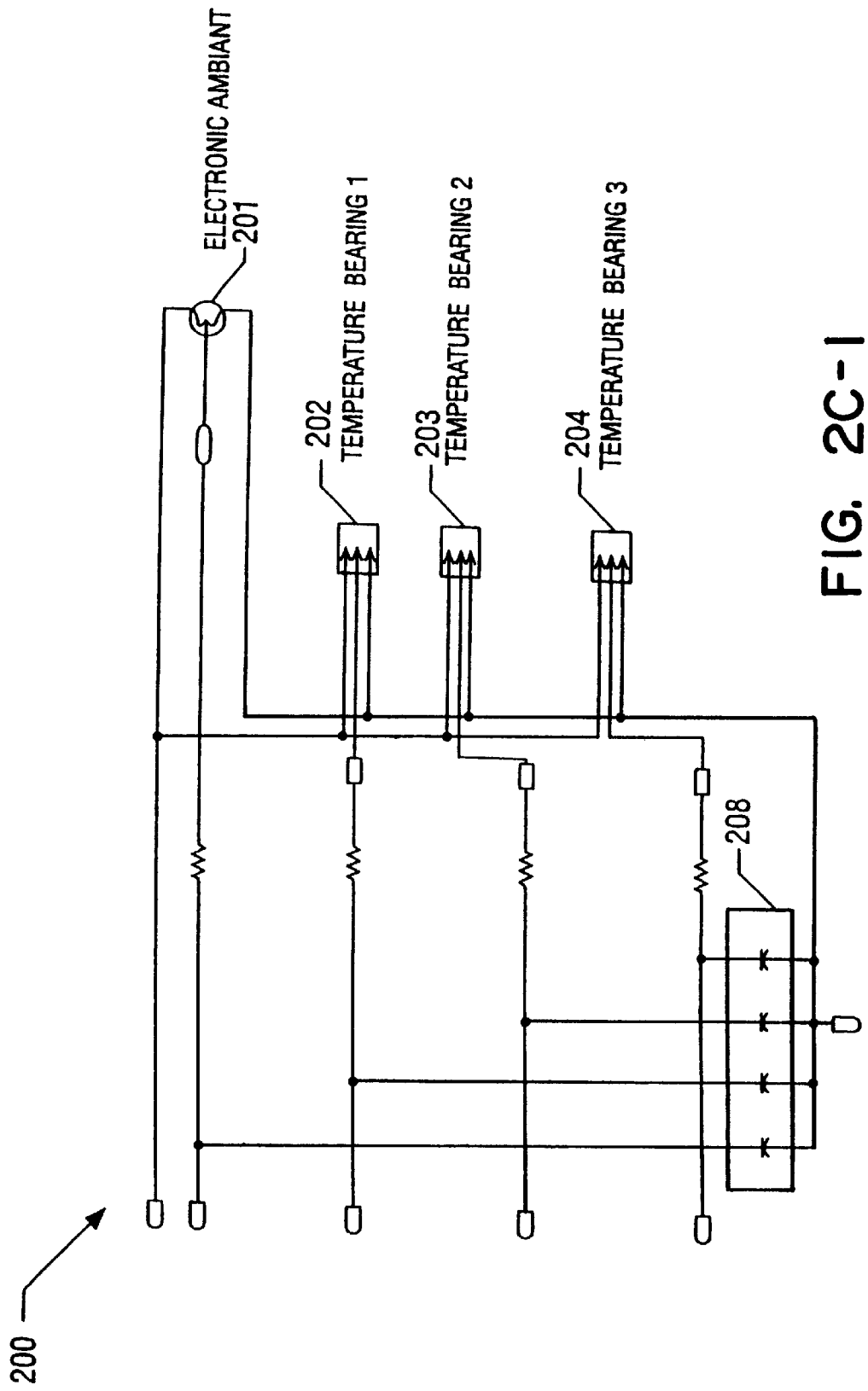

FIG. 2C illustrates in greater detail an alternate sensor set 200 that may be used to provide information for reliable prediction of machine failure.

Referring to FIG. 2C, a schematic for a sensor set 200 is provided. The illustrated exemplary sensor set includes a number of various sensing elements that will be discussed in greater detail below. In the illustrated example, the various sensor elements maybe appropriately affixed to a 2-sided, 4-layered printed circuit board. The components used to construct the sensors may utilize surface mount technology, although through-hole components may also be used.

The sensor set of FIG. 2C includes four three-terminal temperature sensing devices 201, 202, 203, and 204. In the illustrated embodiment, each of the temperature sensors is an AD22100 device that provides a variable analog output that varies with the ambient temperature in the area of the sensing element. In the embodiment of FIG. 2C, the temperature sensor 201 is positioned to detect the ambient temperature of the electric circuit board to which the sensor elements 201, 202, 203 and 204 are attached. Each of sensors 202 and 203 are positioned so as to detect the temperature near the front and rear endshield bearings of the motor to which the sensor set is attached. Sensor 204 is positioned so as to provide a temperature reflective of the temperature of the windings of the motor to which the sensor set 200 is attached.

In one embodiment, the 202 and 203 sensors are coupled to the sensor circuit board by suitable connectors and the temperature sensors themselves are embedded in the endshield or other structure that holds the front and rear bearings. The endshield defines a angular bearing bracket or recess adapted to receive a suitable motor bearing. One or more pockets is formed in the structure and the pockets are sized to receive a temperature sensor of the type used for temperature sensors 202 and 203. Thus, a temperature sensor may be placed in the pocket, and a bearing may be placed in the recess such that the temperature sensor will provide an output signal reflective of the temperature of the bearing. In this manner, the temperature sensor is held in close proximity to the appropriate bearing structure such that the bearing structure helps to maintain the temperature sensor in its desired position and an accurate reading of the bearing temperature may be obtained. In general, the depth of the pocket should be such that the sensor B or C is positioned as closely as possible to the bearing.

Referring back to FIG. 2C, the fourth temperature sensor, sensor 204, is positioned to obtain an accurate reading of the temperature of the windings of the motor to which the sensor set is coupled. In general, the sensor 204 should be positioned to obtain a temperature reading that corresponds to the average temperature of the various motor windings.

Small filter capacitors 208 provide some limited filtering of the analog sensors 201–204.

In addition to including temperature sensors 201–204, the sensor set 200 of FIG. 2C also includes a novel circuit for determining the flux associated with the machine to which the sensor board is coupled. In general, the flux detecting circuit includes a magnetoresistive microcircuit 209. The flux detector may be positioned to the machine housing of the machine to which sensor set 200 is coupled. In general, the flux sensor should be positioned as far as possible from the electrical connections between the phase windings and any drive devices coupled to the machine.

In the illustrated embodiment, the magnetoresistive microcircuit 209 comprises a resistive circuit in the form of a Wheatstone bridge having three elements of a substantially known resistance and a fourth resistive element whose resistance varies depending on the strength of the magnetic field within which the magnetoresistive circuit is positioned. Two terminals of the device are coupled to a known voltage supply and circuit ground, and the other two terminals are monitored to provide an indication of the strength of the magnetic field within which the device is positioned (and thus an indication of the strength of the flux associated with the machine). One magnetoresistive circuit suitable for the above-described application is the HMC1001 one-axis magnetoresistive microcircuit available from Honeywell.

Referring to FIG. 2C, two terminals of the circuit 209 are coupled, respectively, to a Vcc power supply and to a ground. The other two terminals from the device 209 are coupled to the inputs of a differential amplifier 210. The differential amplifier 210 is configured, via a feedback capacitor and resistor, to provide an analog output signal that will vary according the magnetic field near the circuit 209. Because this magnetic field will vary with the leakage flux from the machine to which sensor set 200 is coupled, the analog output signal from differential amplifier 210 will provide an indication of the leakage flux of the machine.

Certain magnetoresistive circuits, such as circuit 209, have a pre-set easy axis (a preferred direction of the magnetic field to be detected) that is set along one axis of the circuit. Under the influence of particularly strong magnetic fields, however, the preferred axis can "flip," thus changing the electrical characteristics of the circuit. Certain such circuits, such as circuit 209 have an on-chip current strap that allows for external re-flipping of the axis in the event that the axis flips in the presence of a strong magnetic field. In the illustrated schematic, a set/reset circuit is provided that will allow for resetting the circuit 209 in the event a high magnetic field is encountered.

In the illustrated embodiment, this resetting function is accomplished as follows: The analog output from differential amplifier 210 is monitored by, for example, a microprocessor that converted the analog value to a digital value. If it is determined that the analog signal has exceeded a preset maximum value corresponding to a high magnetic field, the microprocessor or other monitoring device will generate a flux circuit reset signal that is provided to the set/reset circuit 211. The set/reset circuit 211 will, in response, generate a reset signal that is applied to the circuit 209 so as to reset the circuit 209. Additional information about alternate approaches for setting/resetting magnetoresistive circuits may be found in the data sheets for the Honeywell HMC1001 and in Honeywell application note AN-201 "Set/

Reset Pulse Circuits for Magnetic Sensors" by Mike Caruso, both of which are hereby incorporated by reference.

Referring back to FIG. 2C, in addition to including the temperature and flux sensors described above, the sensor set 200 also includes a novel sensor circuit for detecting insulation failures in an electric machine. In general, the novel insulation failure detector includes an insulation sensor 212 that has one insulation failure output for each phase of the machine to which the sensor 212 is coupled. In the example of FIG. 2C, the insulation failure sensor 212 is coupled to a three-phase machine and there are, therefore, three output leads from the insulation sensor 212. Each of the output leads from the insulation detector is coupled to one terminal of a phase-specific current-limiting resistor 213. The remaining terminals of the resistors 213 are coupled together at a common point 214. A cut-off device 215, such as an optically isolated transistor, is coupled between the common point 214 and a detection node 216. Two current paths exist between the detection node 216 and ground. A first path allows current to flow from ground, through a unidirectional current device 217 (e.g., a diode), to detection node 216. A second current path, through a light-emitting diode and light detection circuit 216, allows current to flow from the detection node 218 to ground.

The insulation failure detection circuit 212 is constructed such that the current will begin to flow through one of the two current paths between detection node 216 and ground when the insulation of the machine fails. One exemplary embodiment of such an insulation failure sensor for a single machine phase is illustrated in FIG. 2D.

Figure 2D:
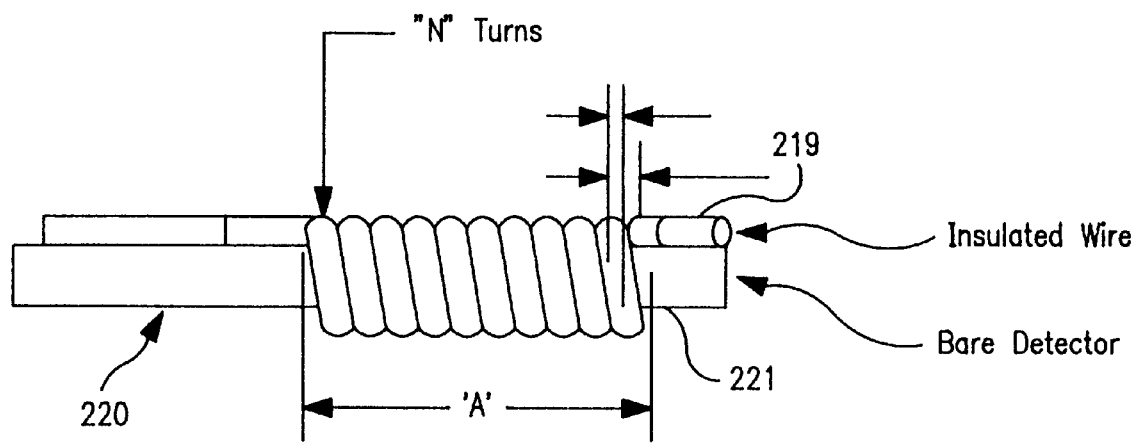
Figure 2E:
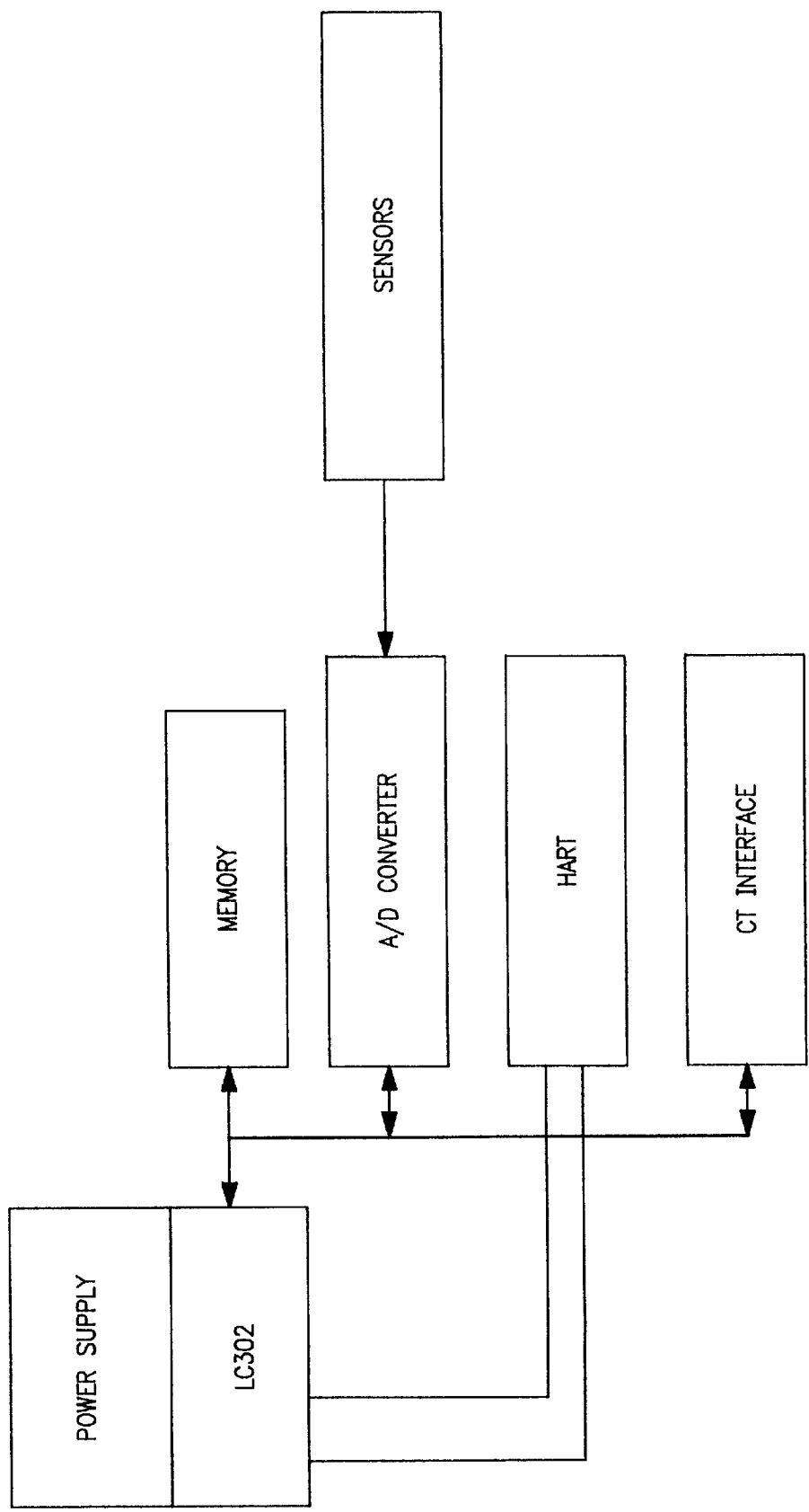

Referring to FIG. 2D, an insulation failure sensor is illustrated for sensing the failure of the insulation surrounding an insulated wire 219. In the specific illustrated example, the insulated wire 219 is one of the wires that form the phase winding of the machine to which the sensor set 200 is coupled. The insulated wire 219 is wound about a wire 220 that includes an uninsulated portion 221. Because the insulated wire 219 is actually a portion of the phase winding of the machine, it is subject to the same stresses as the phase windings of the machine. As the phase winding is subjected to electrical stress and the insulation begins to fail, the resistance of the electrical path between the insulated wire 219 and the uninsulated wire 220 will begin to decrease. Eventually, an electrical path will be created between the insulated wire 219 and the uninsulated wire 220 that can be detected by the insulation failure detection circuit 212 described above. Through use of the described circuitry, insulation failures can be detected and monitored.

It should be noted that in an actual electrical machine, the degree of insulation between any two wire segments of the phase winding will be approximately twice that of the insulating layer separating the insulated wire 219 and the uninsulated wire 220 since each wire segment will have one insulated coating and, thus, there will be two layers of insulation separating each segment of the phase winding. As such, the insulation detector described in connection with FIG. 2D may provide an indication of a potential insulation failure, sufficiently prior to the occurrence of such a failure such that appropriate corrective action may be taken.

Additional details concerning the insulation failure detection circuit may be found in related U.S. Pat. No. 6,087,836, assigned to the assignee of the present application entitled "Apparatus for and Method of monitoring the Status of the Insulation on the Wire in a Winding "by V. Divljakovic et al., the disclosure of which is hereby incorporated by reference.

Referring back to FIG. 2C, the novel circuit set also includes an accelerometer circuit 224 for detecting the acceleration/deacceleration of the electrical machine to which the sensor set is connected. In the illustrated embodiment, the accelerometer circuit 224 comprises a piezioelectric device 225, that provides an analog voltage signal having a magnitude corresponding to the degree of vibration to which the sensor 225 is subjected. In one embodiment, the vibration detector may be an A5100 piezioelectric sensor, available from Oceana. The sensor 225 should be positioned in a portion of the electric machine known to vibrate when the machine is accelerated or deaccelerated. Because acceleration/deacceleration of an electric machine results in the establishment of vibration within the machine, the use of vibration detector 224 can provide information concerning the acceleration/deacceleration of the machine.

The various outputs from the sensors comprising the sensor set of FIG. 2C may be provided to the main control board 27 via suitable electrical connections. Depending on whether the microprocessor used to construct main control board 27 has a built-in analog-to-digital (A/D) converter, an external A/I converter may be used to transform the analog signals from the sensor set to digital signals of the type appropriate for input to the microprocessor 28.

In general, the sensor set and the main control board 27 together form a local monitoring device 12. The specific physical structure of the local monitoring device may vary depending on the particular application and on the electrical machine to be monitored. In general, however, the local monitoring device 12 will consist of a number of appropriate sensors for detecting physical parameters associated with the electrical machine to be monitored, analog-to-digital converters for converting the sensed data into digital form, a microprocessor and memory circuit for assessing and operating on the sensed data, and a communication circuit for communicating with the microprocessor. A power supply for the referenced circuitry will also typically be provided. A high-level block diagram of such a local monitoring device is provided in FIG. 2E.

As explained more fully below, a software routine running on the microprocessor 28 receives the information provided by the sensors described above, normalizes that information, and uses that information—along with provided parameters—to perform local diagnostics on the machine 11 with which the local monitoring device 12 containing the microprocessor 28 is associated. The construction and assembly of the main control board 27 and any software or firmware required to properly operate microprocessor 28, may be conventional and will be within the ability of one of ordinary skill in the art having the benefit of this disclosure.

In one embodiment of the present invention, the microprocessor 28 comprises a microcontroller (such as a Motorola HC11 microcontroller) in which is embedded a data acquisition and local prediction program. This program may be embedded in software or firmware (e.g., a EPROM or ROM) and may use several provided parameters to establish a local model of the machine 11 and, in response to the information provided by the various sensing devices, utilize the model to provide local diagnostic information concerning the appropriate machine.

The data acquisition and local prediction program described above may comprise two general routines: (i) a normalization routine which receives the raw information from the sensors 34a–34e, 35 and 36 and normalizes the raw information to provide normalized information about the state of the machine 11 that is not dependent on the machine load or the environmental conditions in which the machine 11 is operating; and (ii) a predictive routing (such as a neural network or clustering algorithm) that receives the normalized information and, in response to such information, provides an output signal indicative of the remaining life for the machine 11. In some embodiments the local prediction program may also include or be combined with a routine that, in response to the raw or normalized information, provides a recommendation concerning the operation of the local machine (e.g., decrease load).

The normalization of the raw data from the sensors 34a–34e, 35 and 36 may be performed locally within each local monitoring device 12 by a routine running on the microprocessor 28. Such normalization is necessary because, the local machine model established by the program running on microprocessor 28 will generally not be specifically directed to particular load or environmental conditions. As such, to conform the raw sensor data—which is affected by load and environmental conditions—to data acceptable for use in the model, normalization is required. For example, if the machine load changes from a relative low load condition to a relatively high load condition the temperature of the machine will typically rise. For diagnostic purposes, this rise in temperature should be attributed to the change in the machine load and not to a change in the properties of the machine 11.

Equation 1 (below) provides one example of how the raw data from the temperature sensors 34a–34e, 35 and 36 may be normalized to account for load and environmental variations. Specifically, Equation 1 provides an exemplary normalization equation for normalizing temperature data (from the bearings, windings or stator) to account for load and environmental variations.

$$T_N = (T_{sensor} - T_{ambient})/L \qquad \text{Equation 1}$$

In Equation 1, $T_N$ represents the normalized temperature information; $T_{sensor}$ represents the raw temperature reading from the appropriate sensor; $T_{ambient}$ represents the ambient temperature of the environment; and L represents the machine load. The information for $T_{sensor}$ and $T_{ambient}$ may be obtained from appropriate sensors 34a–34e. The information L, representing the machine load, may be obtained through conventional load sensors or load measuring techniques. Alternately, for induction machines, the output of flux sensor 36 may be used to generate the load information L according to a novel method in accordance with certain aspects of the present invention.

For induction machines it is generally known that the rotational frequency of the rotor f(r) is related to the synchronous speed of the stator field f(s) by a parameter referred to as the "slip" S of the machine. Generally, the slip S is expressed as a fraction of the synchronous speed where S=(f(s)−f(r))/f(s) (Equation 2) and where f(r) and f(s) are in RPMs or equivalent units. With this definition of slip, the slip S will vary from a value of 1 at start-up to a value approaching zero at full speed.

Figure 3:
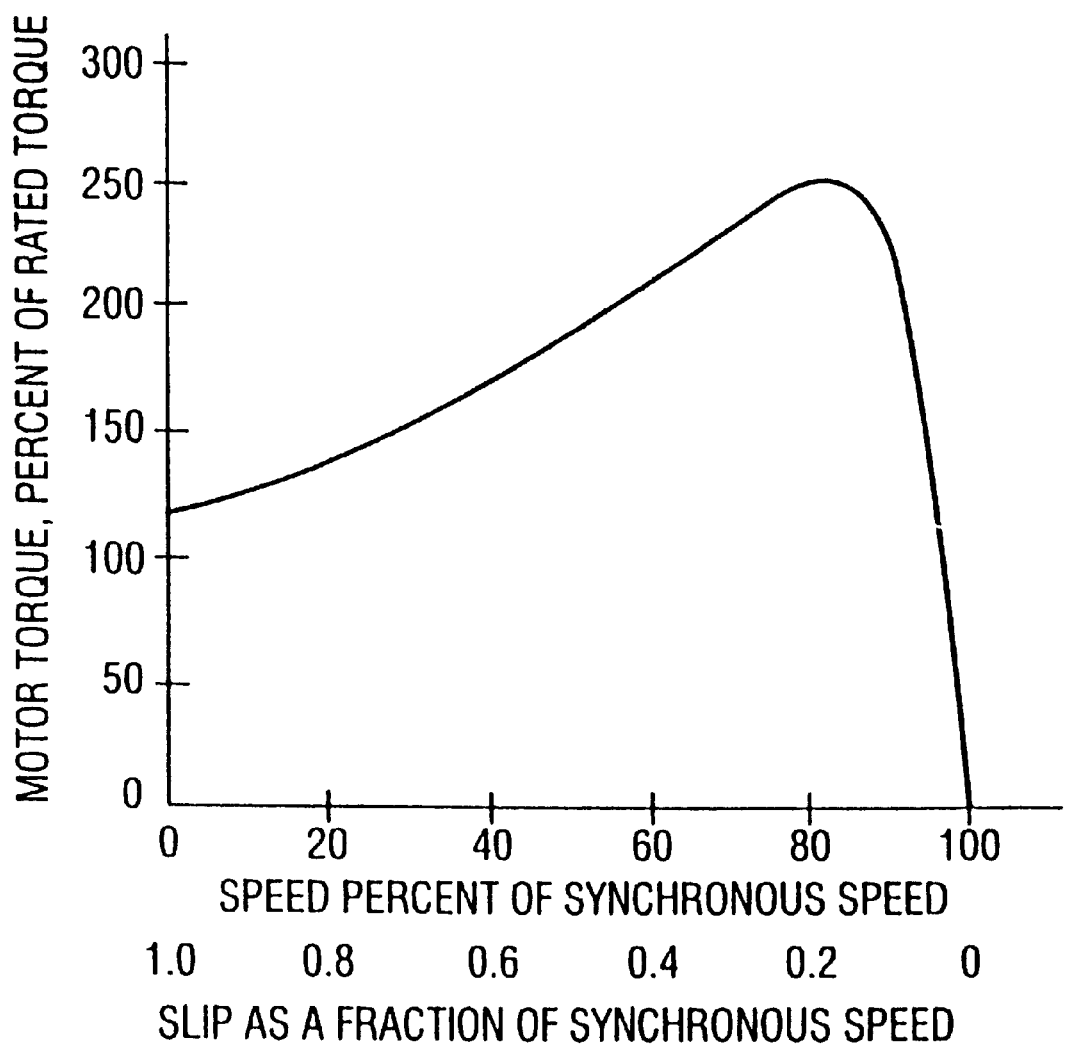
FIG. 3 generally illustrates a typical induction motor torque-speed, torque-slip curve.

In the typical operating range of most induction motors, there is a clear relationship between the slip S of the machine, the rotational speed of the rotor f(r) as a percent of the synchronous stator speed f(s), and the torque output of the machine as a percent of rated torque. FIG. 3 generally illustrates a typical induction motor torque-speed, torque-slip curve.

From FIG. 3 it will be apparent to those of ordinary skill in the art having the benefit of this disclosure that, knowing the slip of an induction machine S, it is possible to approximately determine the torque output of the machine and, thus, the load L of the machine and the rotational speed of the rotor.

FIG. 4 illustrates a novel circuit for determining the slip S of an induction machine using the flux sensor 36.

Referring to FIG. 4 the output of flux sensor 36 is passed through a low pass filter 41 to produce a filtered version of the flux sensor output. The filtered output is applied to one input of a two input digital comparator 42. The voltage across a bias resistor 43 is provided to the other input of digital comparator 42. The digital comparator 42 will compare the filtered output of the flux sensor with the voltage across resistor 43 and produce a signal having a value of logic 1 when the filtered flux signal is greater than the voltage across resistor 43 and a value of logic 0 when the converse is true. During normal operation of the machine, the output of flux sensor 36 will vary in an approximately sinusoidal fashion and, thus, the value of the filtered flux signal will periodically vary above and below the voltage across resistor 43. Thus, the output of comparator 42 will be a series of digital pulses.

The present inventors have recognized that, in general, the frequency associated with the digital pulses at the output of comparator 42 will correspond to the rotational frequency of the rotor f(r). Thus, by monitoring the frequency of the digital pulse train at the output of comparator 42 it is possible to obtain an indication of f(r), which will provide an indication of the speed of the rotor. The selection of the appropriate low pass filter 41 and the appropriate voltage across resistor 43 will be apparent to those of ordinary skill in the art having the benefit of this disclosure.

In FIG. 4, the low pass filter, comparator 42 and resistor 43 are all individual components and the digital pulse train from comparator 42 is provided as input to microprocessor 28 which monitors the pulse train according to known techniques to derive a digital signal corresponding to f(r). Alternate embodiments are envisioned wherein the raw analog output from sensor 36 is converted to a digital value and the low pass filtering and comparison associated with comparator 42 are accomplished through appropriate software. In either embodiment the frequency of the pulse train produced by comparator 42 is used to generate a digital signal corresponding to f(r).

Referring to FIG. 4, it may be noted that the raw output from flux sensor 36 is also passed through a band-pass filter 44 which will pass only signals within a selected frequency range. For most induction machines, the band-pass filter should be constructed to pass frequencies near the expected synchronous stator frequency f(s) which will typically be around 60 Hz. In the embodiment of FIG. 4 the output form the bandpass filter 44 is applied to an A-D converter 45 (which may be built-in to microprocessor 28) and a Fast Fourier Transform ("FFT") is performed on the digital signal at block 46 to determine the major frequency component of the signal. This major frequency component will be a digital signal and will correspond to the synchronous stator frequency f(s).

Using the digital signals corresponding to f(r) and f(s) Equation 2 may be used to determine the slip S of machine 11 and, using a look-up table or algorithm corresponding to the slip-torque curve of FIG. 3, the output torque or load L of the machine 11 may be determined. This load value L then be used for normalization purposes using Equation 1, above.

In accordance with another embodiment of the present invention the load information L for an induction motor may be derived through a routine running on the microprocessor 28. According to this embodiment, the output from the flux sensor 36 is applied to an A/D converter on-board the microprocessor 28. The digital signals corresponding to the flux sensor output are processed, through the use of a digital low pass filter and FFT or other appropriate techniques to, and the peak frequency component below a first predetermined frequency is identified. For most applications the first predetermined frequency will be approximately 50 Hz. This peak frequency component below the first predetermined frequency corresponds to the rotor frequency f(r).

In addition to analyzing the digital signals representing the output of the flux sensor 36, the routing may also use a digital high pass filter and FFT or other appropriate techniques to determine the peak frequency component above a second predetermined frequency. For most applications, the second predetermined frequency will be just below the first predetermined frequency. For example, if the first predetermined frequency is 50 Hz., the second predetermined frequency may be 49 Hz. The peak frequency above the second predetermined frequency will generally corresponds to the synchronous stator frequency or f(s).

Using the values for f(r) and f(s) it is possible to determine the slip S, the torque output or load L, and the rotor speed, using the methods previously described.

One benefit of the digital approach for determining the load information L is that it is possible to confirm that the f(r), f(s) and S values are accurate. Appropriate confirmation techniques are generally illustrated by FIG. 5. FIG. 5 generally illustrates the frequency spectrum that may be obtained through appropriate processing of the digital signals corresponding to the output of the flux sensor 36. Specifically, FIG. 5 illustrates the peak frequency below the first predetermined frequency f(r) and the peak frequency above the second predetermined value f(s). As explained above these f(r) and f(s) values may be used to derive the slip value S.

In most induction motor applications, the synchronous stator frequency f(s) will correspond to the fundamental frequency of the power supply. Accordingly, a frequency peak will typically be found at frequencies corresponding to three times and seven times this fundamental frequency. Thus, once f(s) is derived using the techniques described above, the routine can look for frequency peaks near or at 3*f(s) and 7*f(s). The presence of peaks at these frequencies (as reflected in FIG. 5) will confirm that the calculated f(s) is the appropriate f(s). If appropriate peaks are not found, the routine can continue to calculate f(s) until a confirmed, valid f(s) is obtained.

In addition to providing for easy confirmation of the validity of the calculated f(s) the digital technique described above allows for easy confirmation of the slip value S. For an operating machine, a frequency peak will be expected at the frequency corresponding to S*f(s). Thus, once S is calculated and a confirmed valid f(s) is obtained, the routine can look for a frequency peak near S*f(s). The presence of such a peak (illustrated in FIG. 5) will confirm the validity of the S value.

The above example demonstrated how normalization techniques in accordance with the present invention may be used to normalize data from temperature sensors. Similar techniques may be used to normalize the data obtained from the vibration sensors. Moreover, for the vibration sensor 35, techniques may be used to normalize the vibrational data to filter out vibrations not attributable to the machine but rather to the mounting configuration of the machine.

From the normalized information corresponding to the temperature sensors, flux sensor and vibration sensor, various normalized information groups may be collected and maintained in memory by a routine running on the microprocessor 28. For example, for a given machine 11 and local monitoring device 12 the microprocessor 28 may collect and store data corresponding to:

(i) the difference between the measured normalized bearing temperature and the environmental temperature for various points in time;

(ii) the difference between the normalized machine winding temperature and the ambient environmental temperature;

(iii) the rotational speed of the machine as determined from the output of the flux sensor;

(iv) the harmonics of the output of the flux sensor (for use in detecting broken rotor bars);

(v) the spectral lines from the vibration sensor for the appropriate rotational frequencies and their harmonics (for use in determining the frequency of bearing failures);

(vi) the normalized aggregate time spent by the machine at certain temperatures;

(vii) the normalized aggregate time spent by the machine at certain rotational speeds; and (viii) the number of times the machine is started and stopped (which may be derived from the output of the vibration sensor).

The identified data, collected and stored by the microprocessor 28, may be used locally by the microprocessor 28 for diagnostic purposes or communicated by the microprocessor 28 to the site processor 14 or to an appropriate protocol converter 13 for other uses. The external communication of the collected and stored information may be initiated locally by a routine running on the microprocessor 28 or in response to a polling signal from the site computer 14, a protocol converter 13, or other device.

Those of ordinary skill in the art will appreciate that the identified categories of data to be collected and stored by the microprocessor are exemplary only and that other categories of data may be included and that some of the identified categories may be omitted.

For example, in one embodiment the local monitoring device 12 may be configured to store and update a number of different operating parameters relating to the electric machine coupled to the local monitoring device. Specifically, the local monitoring device 12 may be configured to include a unique identifier, such as a serial number, which may be used to uniquely identify the electrical machine coupled to the device 12.

The local monitoring device 12 may also be configured to be stored in a memory location counter data corresponding to the number of motor starts. In general, this counter may be incremented every time the electric machine coupled to the local monitoring device 12 is powered up. The counter may be temporarily stored in RAM memory associated with microprocessor 28 and transferred to the flash memory on a daily basis such that the flash memory in the local monitoring device includes information (updated daily) relating to the number of times the electrical machine has been started.

Another important operating parameter that may be monitored by the local monitoring device 12 is the total elapsed running time of the electric machine. This data may be maintained by the microprocessor and/or written to the flash memory in the local monitoring device on a periodic basis (e.g., once an hour).

As explained above, once the normalized and preprocessed data is obtained and stored by the normalization routine running on microprocessor 28, one or more local predictive routines may use that data to provide diagnostic information concerning the appropriate machine 11.

Figure 6:
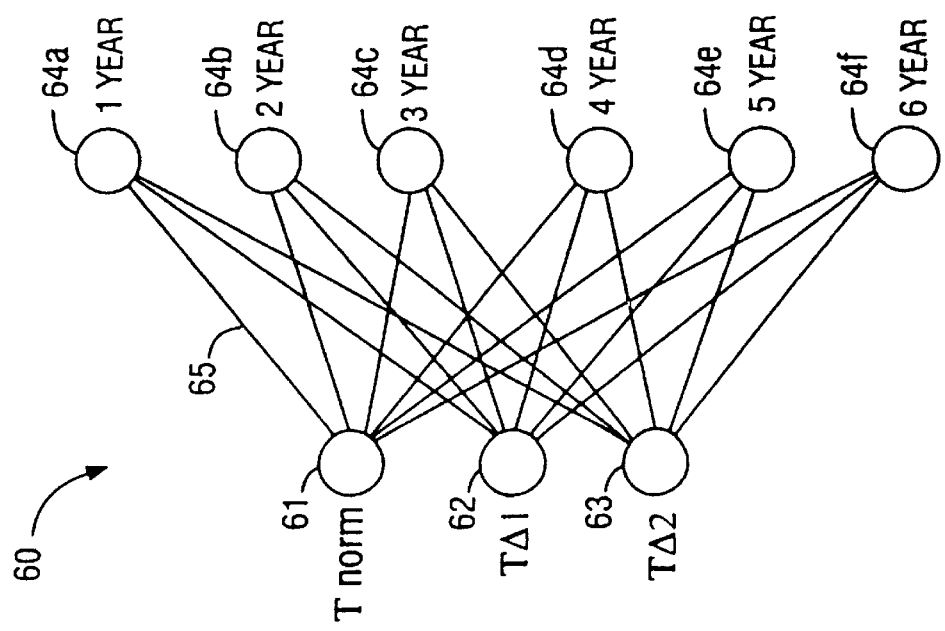
FIG. 6 illustrates an exemplary predictive routine in accordance with certain aspects of the present invention.

One exemplary predictive routine is generally illustrated in FIG. 6.

The predictive routine illustrated in FIG. 6 may be used to receive information concerning the normalized temperature of the bearings of machine 11 and, based on that information, provide local diagnostic information concerning the expected life of the machine. The exemplary illustrated routine utilizes a local neural network, such as a Kohonen network that receives as inputs appropriate normalized bearing temperature information and provides as outputs an indication of the expected life of the motor bearings.

Referring to FIG. 6, a two-layer neural network 60 is illustrated. As illustrated the neural network includes three input nodes 61, 62 and 63 and six output nodes 64a–64f. As those of ordinary skill in the art will appreciate, each of the output nodes receives as inputs some or all of the outputs from each of the input nodes. In accordance with conventional neural network techniques the outputs from the input nodes are appropriately "weighted" such that the value of each output node will correspond generally to the sum of its weighted inputs. In one embodiment the neural network is a "inner-take-all" network in which the output of the network is determined by the output node with the highest value.

Figure 7:
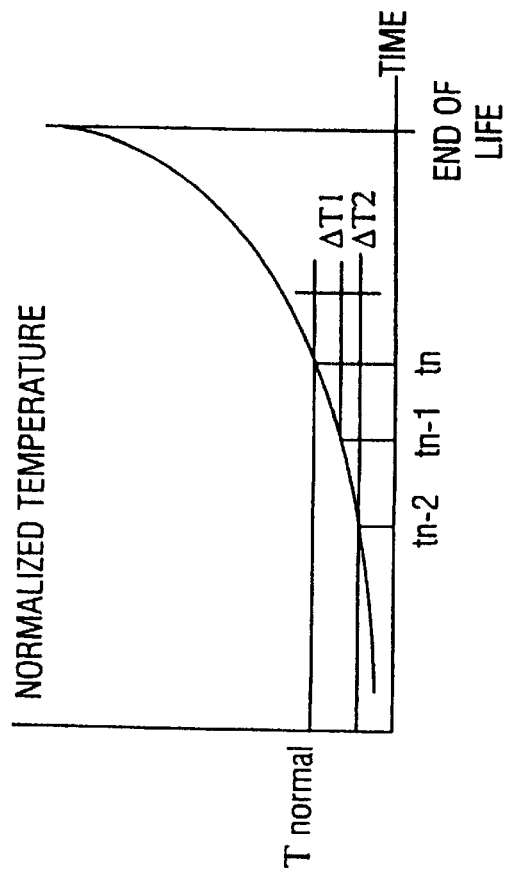
FIG. 7 generally illustrates the manner in which the input data for the exemplary predictive routine of FIG. 6 may be obtained.

In the embodiment illustrated in FIG. 6 the inputs to the three input nodes correspond to: (i) the normalized temperature Tnorm of the appropriate bearing at a time $t_0$ (for node 61); (ii) the gradient $\Delta T1$ between the normalized temperature Tnorm for the bearing at time $t_0$ and the normalized temperature Tnorm for the bearing at an earlier time $t_{-1}$ (for node 62); and (iii) the difference $\Delta T2$ between the normalized temperature Tnorm for the bearing at time $t_0$ and the normalized temperature Tnorm for the bearing at a time $t_{-2}$, where $t_{-2}$ corresponds to a time one time period before $t_{-1}$ (for node 63). FIG. 7 generally illustrates the measured value of $T_{norm}$ over time and the manner in which $\Delta T1$ and $\Delta T2$ may be obtained.

Using the input information applied to the input nodes 61, 62 and 63 and the weights assigned to the various outputs of the input nodes, the neural network will yield one output node with a higher value that the other output nodes. In the example of FIG. 6, each output node 64a–64f corresponds to an particular value of expected bearing life. For example, node 64a represents an expected bearing life of 1 year, while node 64e represents an expected bearing life of 5 years. Thus, by processing the information provided to the input nodes 61, 62 and 63, the neural network 60 will select one output node as the "winner" and provide an indication of the expected life of the bearing being analyzed.

The information concerning the expected bearing life derived from the neural network 60 may be stored by microprocessor 28 for use in determining the overall health of the motor (for selection of the appropriate red, yellow or green indicator) and/or for external communication purposes as described more fully below.

In one embodiment of the present invention the parameters of the neural network 60 that define the weights of the various outputs for the input nodes 61, 62 and 63 are stored in the data storage device 29 associated with microprocessor 28 and are accessed by the routine running on microprocessor 28 that establishes the neural network 60. These parameters are referred to herein as the "weighting parameters."

The weighting parameters may be provided to the various microprocessors 28 associated with the various local monitoring devices 12 in a number of ways. In accordance with one embodiment of the present invention the weighting parameters are developed by first establishing a global neural network similar to neural network 60 and then "training" the neural network through known training techniques using data obtained through accelerated aging tests. In this embodiment, accelerated aging data (e.g., data corresponding to the $t_{-n}, \ldots t_{-1}, t_0, t_1 \ldots t_n$, points) is obtained and converted into real time intervals by properly annotating the outputs of the neural network to be trained. Once this global neural network is trained with the accelerated aging data, the resulting weighting parameters can be downloaded into the data storage devices 29 of each of the local monitoring devices through the communication systems generally illustrated in FIG. 1.

In the above embodiment the global neural network that is trained may be any type of appropriate neural network or predictive algorithm, including a back propagation network, a general recession network, a self-organized map, or a feed-forward network. The accelerated aging data used to train the global network may include accelerated data relating to the thermal aging of the machine insulation, the thermal aging of the machine bearings, and the electrical aging of the machine bearings.

While the previously-described approach to establishing the weighting parameters for the various local monitoring devices 12 is acceptable for many applications, it is limited in that the data used to establish the weighting parameters through training of the global neural network was obtained from laboratory tests. As those of ordinary skill in the art will appreciate, laboratory tests, while highly accurate, often cannot exactly replicate all scenarios actually encountered in the field. Moreover, the data used to train the global neural network in the previously-described approach is obtained from a limited number of motors. Each of these motors will have been constructed according to a particular manufacturing process and from a certain group of materials. Accordingly, while the weight parameters obtained when the laboratory data is used to train the global neural network may be valid for the laboratory tested motors, they may not be as valid for motors manufactured using a different manufacturing process or formed from different materials or for motors operating in different environments.

As a further enhancement of the previously-described approach to machine diagnostics, the present invention contemplates the use of a distributed diagnostic system in which data about a plurality of machines is regularly collected in the field by local monitoring devices, in the manner previously described. This field-collected data is then provided to a centralized data processor running one or more global neural networks. Each of these global neural networks will use the field gathered data as training data to develop updated weighting parameters that will, in turn, be provided back to the local monitoring devices for local diagnostic purposes.

FIG. 1, previously described, illustrates certain aspects of this distributed diagnostic system. When the system of FIG. 1 is used to implement a distributed diagnostic system as described above, each of the local monitoring devices 12 will include a microprocessor running a local predictive neural network, such as neural network 60 as described above. Initially, each local predictive neural network will be established using weighting parameters provided the appropriate local monitoring device. Typically, these initial weighting parameters will be derived from accelerated aging data as described above.

In the described system, each local monitoring device 12 will collect, pre-process and normalize data about the machine 11 to which it is attached. At certain intervals, the local monitoring devices 12 will provide this collected data (and data indicating when a machine 11 fails) to the site processor 14 via the protocol converters 13, along with data identifying the machine from which such data was obtained.

The site processor 14 will include a data processor running one or more global neural networks for, e.g., predicting the expected life of machine 11. Each such neural network will initially operate according to weighting parameters established from accelerated test data but will also be adapted to receive the field-collected data from the local monitoring devices 12 and use such field collected data to update the weighting parameters. For example, whenever a machine 11 fails, the collected data corresponding to that machine may be used by such a global neural network as a known data set for training purposes. Thus, each global neural network running on site processor 14 will have weighting parameters that are initially determined from accelerated testing data but that are refined, over time, in response to actual field collected data. These globally updated weighting parameters may then be downloaded to the local monitoring devices at various intervals to further enhance the local monitoring devices ability to predict the lifetime of the machine to which it is attached.

As a still further enhancement of the describe system, the field collected data provided to site processor 14 may be collected and forwarded, along with other information, to a centralized database 15 that receives such information from other site processors 14', 14" This centralized database 15 may include one or more "super-global" neural networks that receive the relevant field-collected data and develop updated weighting parameter data for transmission to the various site processors 14.

The use of global or super-global neural networks as described above allows for increased diagnostic capabilities. For example, a global or super-global neural network may be able to analyze field collected data from a variety of machines manufactured at different times or from different materials and determine that the failure modes or expected lifetimes for machines manufactured at one time (or with a certain type of material) are different from the failure modes and expected lifetimes for other machines. The processor running the global or super-global neural network may then be able to take this information, develop specific weighting parameters for such machines, and provide the updated, manufacturing or material specific weighting parameters to the appropriate local monitoring devices. Similarly, a global or super-global neural network may be able to develop weighting parameters that are specific to a particular environmental or load condition.

According to one embodiment of the present invention the training of the global or super-global neural networks may be based on the Weibull law. The Weibull law has been found useful in determining the mean time to failure and mean time between failures for various machines. Generally, the law holds that—for machines sharing some common characteristic—the probability of a machine failure will be high at the inception of the machine's life, will level down during the normal expected life, and will rise again as the end of the expected machine life approaches. For a given group of machines, the data for this Weibull characteristic will be initially unknown. It would be beneficial, however, to begin to train the global and super-global neural networks using data reflecting the totality of the Weibull characteristic, rather than just the data reflecting the inception of the machines life. Accordingly, for this embodiment, a Weibull factor is used in the training of the global and super-global neural networks, such that training is initially disabled or minimized until sufficient data covering the entire Weibull characteristic is obtained. In this way, the training of the global and super-global neural networks will be enhanced.

In the example described above the local neural network 60 and the global and super-global neural networks received information concerning the bearing temperature and provided output information representative of the expected lifetime of the machine bearings. Alternate local, global, and super-global neural networks are envisioned. For example, a set of neural networks may receive as inputs data indicating the time spent by the machine at various temperatures and the number of starts and stops. The outputs of such a neural network may indicate the expected lifetime of the machine's insulation system.

Alternately, a neural network can receive data reflecting the past and present vibration experience of the machine. Such data can, like the bearing temperature data, be used to predict the expected lifetime of the machine's bearings. Still further, a neural network may receive inputs reflecting the rotor flux frequency and provide an output indicative of rotor failures.

Those of ordinary skill in the art will appreciate that, while the exemplary illustrated neural network 60 comprised a two layer network, that other more or less complicated neural networks may be used to practice the present invention. For example, neural networks having three, four or more layers and a number of inputs and outputs different from that of network 60 may be used without departing from the scope of the present invention.

The local monitoring device 12 described herein may be advantageously used in a variety of applications including initial testing and quality control. For example, an electric machine/local monitoring device pair may be operated in a "birth certificate" mode in which the initial quality of the machine is assessed and the base operating parameters of the machine are determined. The device pair may also be operated in a "confirmation" mode to ensure proper installation of a machine and in a "monitoring" mode where the machine is monitored over time. Each of the various operating modes will be discussed in greater detail below.

In each of the various operating modes of the local monitoring device/electric machine pair, the local monitoring device will perform a number of "tasks" and may respond to various machine events. For example, in the "birth certificate" mode, the local monitoring device/electric machine pair, may communicate with an appropriately programmed personal computer to both initialize the local monitoring device and to perform initial quality tests.

Figure 8:
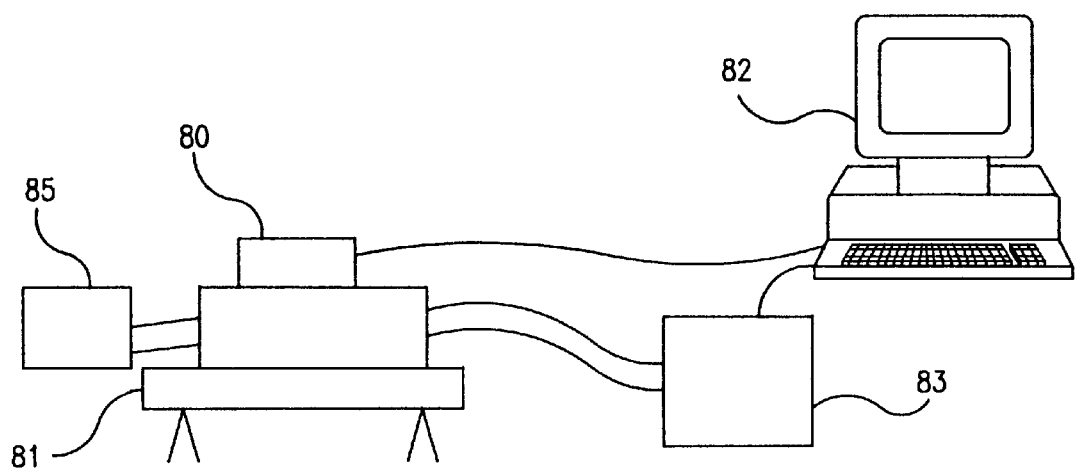
FIG. 8 illustrates the use of a local monitor device constructed according to various aspects of the present invention with an external personal computer.

Referring to FIG. 8, a local monitoring device/machine pair 80 may be placed on a motor test pad 81 in compliance with NEMA vibration testing specifications. In the illustrated example, the local monitoring device includes the sensor set illustrated in FIG. 2C. The communications port of the local monitoring device is coupled via an appropriate communications link to a personal computer 82. The personal computer 82 is coupled to a drive device 83 that is capable of energizing the motor at various voltage and current levels and at various operating frequencies. The drive 83 (which may be an converter, inductor, PWM drive or other appropriate drive) has an output coupled to the phase windings of the electric machine. A load or shaft drive device 85 may be coupled to the shaft output of the machine.

Figures 1, 9:
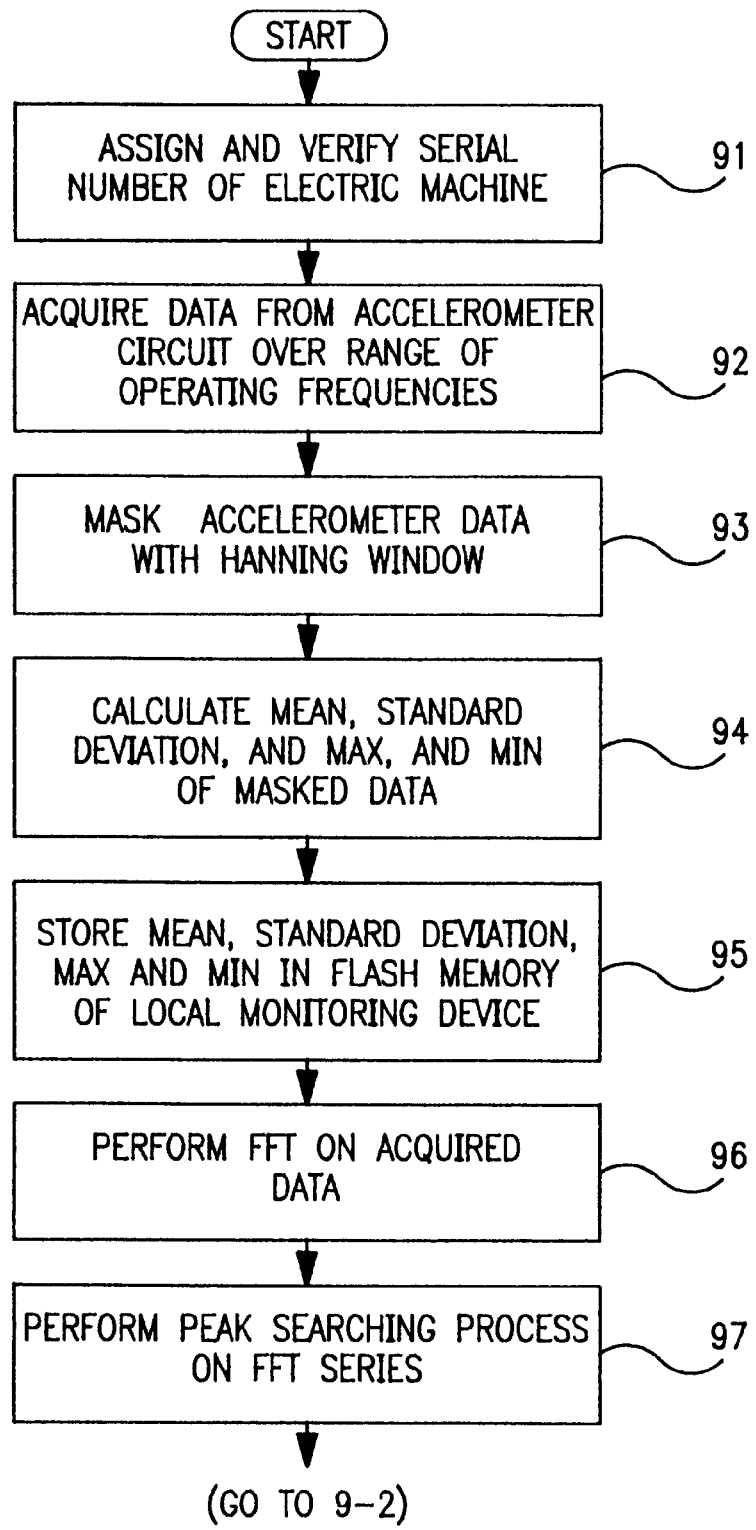
FIG. 9 provides a flow chart of the operation of a local monitor device constructed according to various aspects of the present invention in a Birth Certificate mode.
Figures 2, 9:
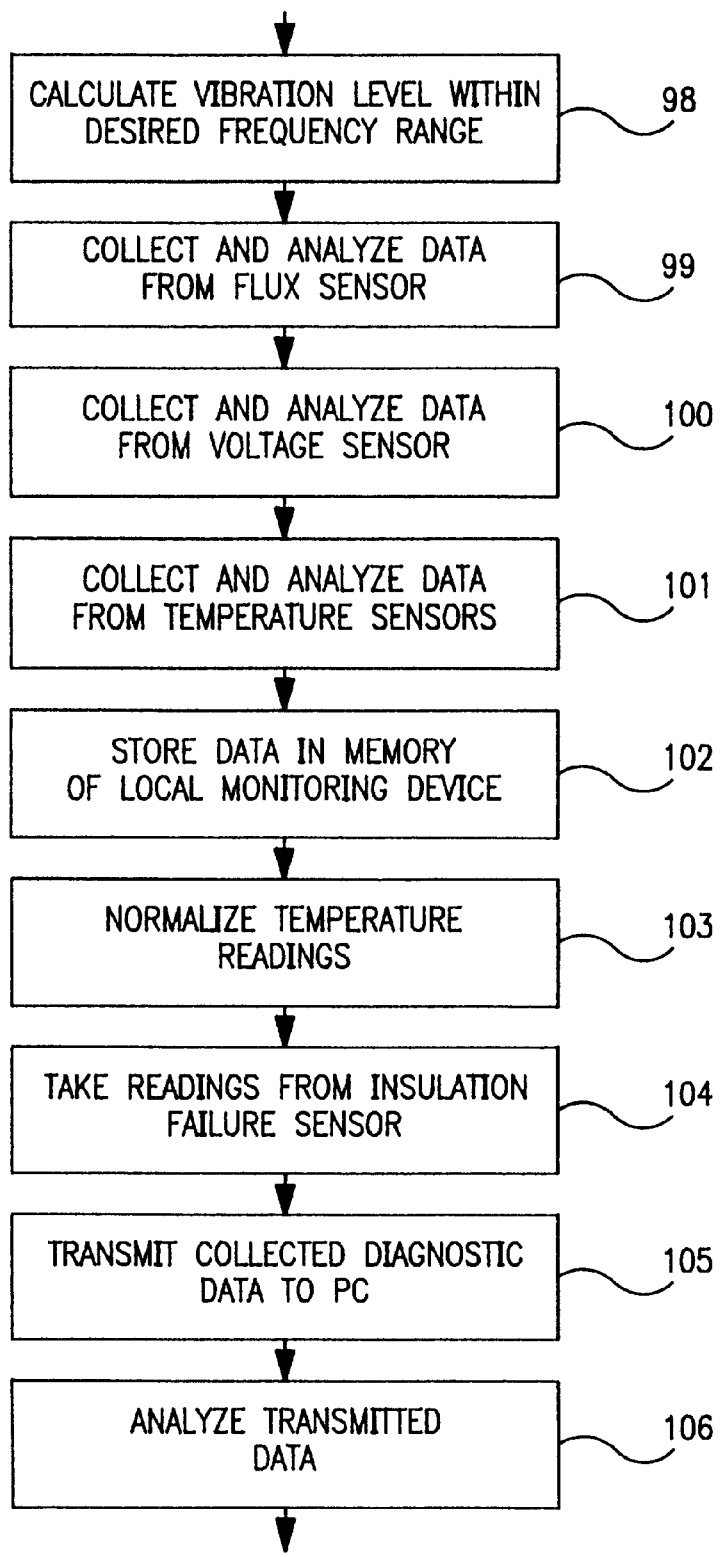

FIG. 9 generally illustrates a flow chart of tasks that may be implemented by the microprocessor contained in the local monitoring device during "birth certificate" mode operation.

In the illustrated example, the flash memory for the local monitoring device/machine pair includes a serial model number register that is initially set to zero. Accordingly, upon the initiation of the birth certificate mode, the PC will provide at step 91 a data signal to the local monitoring device assigning the local monitoring device/machine pair a specific serial number and a model number corresponding the electrical machine. The local monitoring device will then store the serial number and model number at the appropriate location in its Flash memory and may return the serial number and model number to the PC for confirmation Once the serial number and model number data is written into the flash memory, initial data acquisition may begin at Task 1.

In Task 1 in the Birth Certificate mode, the local monitoring device 80 will acquire data from the accelerometer circuit of FIG. 2D as the electric machine is operated over a variety of operating frequencies (e.g., from 0 Hz. to 1200 Hz.) in Step 92. The program running in the local monitoring device may first mask the collected data with a Hanning window to avoid problems with asynchronous acquisition of periodic data and then call various statistical functions to operate on the collected data to provide useful baseline vibration data concerning the operation of the electrical machine. In one example, the local monitoring device will determine and store in flash memory: (i) the vibration sensor mean; (ii) the vibration sensor variance or standard deviation; (iii) the vibration sensor range (e.g., the difference between the maximum and the minimum vibration data points); (iv) overall vibration characteristics of the machine; and (v) characteristic vibration spectrum frequencies of the machine (e.g., rotational ball failure, inner and outer race).

Referring to FIG. 9, in Task 1 the local monitoring device will first acquire data, in Step 92, from the accelerometer of FIG. 2C as the machine is operated over a desired range of operating frequencies. The local monitoring device (or the PC which may receive the accelerometer data from the communications circuit of the local monitoring device) may then mask the collected data with a Hanning window at step 93 and call a conventional statistical analysis package to calculate the mean value of the detected vibration data, the standard deviation of that data, the minimum and maximum data points and the range of the data points at step 94. Those values may then be stored in the flash memory associated with the local monitoring device at step 95.

Figure 10A:
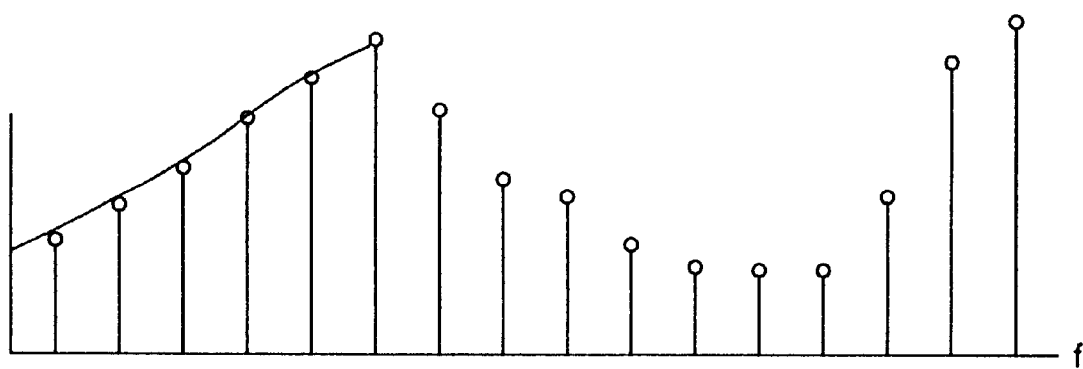
FIGS. 10A–B illustrate a peak searching process that may be used by a local monitoring device constructed according to certain teachings of the present invention.
Figure 10B:
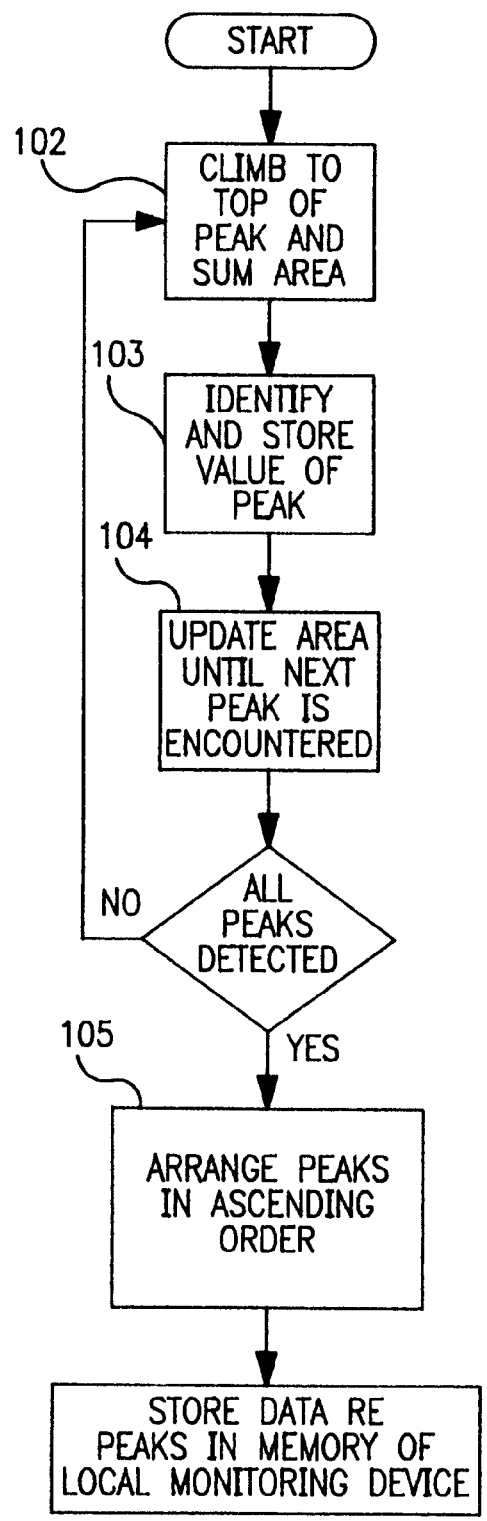

After calculating the basic statistical data, the microprocessor in the local monitoring device, or the PC, may perform a fast Forieur transform (FFT) on the acquired data at step 96 and perform a peak searching process to identify peaks in the collected data at step 97. The peak searching process of the present invention is illustrated in greater detail in FIGS. 3, 10A and 10B. In general, the process begins by analyzing the first peak of the FFT data by "climbing" to the top of the peak and summing up the area of the peak as the climb rises from the bottom of the peak to the top of the peak at Step 102. Once the top of the peak is detected, the peak frequency value of the peak and the area under the peak is stored in temporary storage at Step 103. The area for that peak is then updated until a flat part in the FFT spectrum or the beginning of the next peak is detected at Step 104. The next peak is analyzed in the same fashion and the peak frequency and area values for the various peaks are then arranged in temporary storage in ascending order at Step 105.

In one embodiment, only the top twenty peaks are stored in temporary memory. Once twenty peaks are obtained, the data for each subsequent peak is either lost (if the peaks are less than the smallest stored peak) or are positioned within the stored data at the appropriate location. Once the review of the FFT spectrum is completed, the data for the top twenty peaks is stored in the flash memory.

Returning to FIG. 9, once the peak searching process is completed and the data for the top twenty peaks is stored in the flash memory, the overall vibration level in a desired frequency range of interest is calculated at step 98 by summing up the areas for all of the peaks that fall within the desired frequency range. The desired frequency range will vary from application to application and machine to machine but, in general, will correspond to a range slightly greater than the frequency range that corresponds to the normal operation of the machine.

Once the accelerometer data is obtained and processed in Task 1, the routine in the local monitoring device or in the PC will obtain and analyze data from the flux sensor of FIG. 2C as the machine is operated over a desired frequency range at Step 99. In general, the processing of the data from the flux sensor is handled like the data from the accelerometer, in that, the data is first masked with a Hamming window, analyzed using conventional statistical techniques to produce mean, standard deviation, min/max and range data. A FFT is performed and the FFT spectrum is processed using the techniques described above to provide data concerning the top twenty flux peaks and the overall flux level for a desired frequency range.

After completing Task 2 the appropriate routine will implement a Task 3 in which the data from the voltage sensor is received and analyzed at Step 100. In Task 3, the voltage data is collected, passed through a Hamming window and analyzed to produce mean, standard deviation, min/max and range data. In the illustrated embodiment, no FFT processing of the voltage data is performed.

Following the processing of the voltage data in Task 3, the processor in the illustrated embodiments will implement Tasks 4, 5 and 6 at Step 101. In each step, the temperature data of either the first bearing temperature sensor (Task 4), the second bearing temperature sensor (Task 5), or the winding temperature sensor (Task 6) is taken over a range of operating frequencies and stored in temporary memory. The temperature data is then statistically analyzed to produce appropriate mean, standard deviation, min/max and range data that is stored in the flash memory associated with the local monitoring device.

In Task 7, the processor will collect temperature data from the ambient temperature sensor and will calculate mean, standard deviation, min/max and range data that is stored in the flash memory associated with the local monitoring device at Step 102. The processor will then use the ambient temperature values determined in Task 7 to normalize the values calculated in Tasks 4, 5 and 6, using the normalization methods and processes described above, at Step 103. The normalized temperature values will then be stored in the flash memory associated with the local monitoring device.

Upon the completion of Task 7, the local monitoring device, or the PC via communications with the local monitoring device, will take a number (e.g., 10) consecutive readings of the output of the insulation failure sensor of FIG. 2D at Step 104. An error flag will be set if an insulation failure is detected, otherwise, the process will pass Task 8 and proceed to a final analysis step.

In the final analysis step, all of the initial data collected and stored in the flash memory of the local monitoring device will be transmitted to the PC in response to an appropriate data request at Step 105. The PC will then compare that data with statistical data corresponding to other motors of the same model as the motor involved in the birth certificate testing. That data from the motor under testing will be compared by the PC with the statistical data for all other motors of the same model and, if the data for the motor differs from the stored statistical average data for that model by more than a given amount (e.g., 5%), the motor under testing will be rejected as falling outside established quality guidelines. If the motor is within the quality guidelines, then the motor will pass the initial birth certificate testing, and the motor data may be used to update the appropriate statistical data in the PC at Step 106.

Once a local monitoring device and electric machine pair has received its "birth certificate" data through the process described above, it may be operated in a "Confirmation Mode" where the motor is analyzed to verify that it has not been damaged in transient or after a particular electrical or environmental act (e.g., a plant shutdown, a serious storm, etc.). In the confirmation mode, the local monitoring device and machine pair may be placed on a test pad of the type used in the birth certificate processing described above and the birth certificate tasks may be performed with the data being stored in a temporary location. If the data taken during these confirmation mode operations differs from the data obtained in the birth certificate mode by a given amount (e.g., more than 10%), a motor error or fault signal may be provided indicating that the motor should be inspected for possible damage or serious deterioration.

While the electric machine data obtained and stored by the local monitoring device in the birth certificate mode may be useful in monitoring the corresponding electric machine during its operation to determine the anticipated life of the machine, the degree to which such data may be used depends, in large part, on the specific application for which the machine is used. Knowing the typical load of the machine can allow for more efficient use of the birth certificate data. Accordingly, the local monitoring devices of the present invention may be used in a "learning" mode to determine the typical load for its associated machine. The inclusion of such a learning mode is beneficial, in that, it allows for a single local monitoring device configuration to be used on machines having a number of different applications.

As illustrated in FIGS. 11A–11C, there are three basic load characteristics for electric machine operation. In the first application, illustrated in FIG. 11A, the electric machine runs at a substantially constant speed and is subjected to a substantially constant load. This type of load is often encountered when a motor is used to drive a conveyor belt on a continuously operating assembly line. In the second typical application, illustrated in FIG. 11B, the electric machine operates in an ON/OFF manner, where the machine is either ON and running at a given speed and with a given load or OFF. This ON/OFF application may be associated with the operation of a fan that is on only during part of the day or when room temperatures exceeds a desired value. In the third application, illustrated in FIG. 11C, the electric machine is subjected to erratic load and speed changes. The local monitoring device of the present invention my include routines that will allow it to properly assess the load characteristics of the motor to which it is attached.

There are various reasons for determining the load characteristics of a motor. First, by monitoring the load conditions of a machine, it is possible to identify specific load conditions at which data may be taken to accurately diagnose the condition and anticipated future life of the machine. In particular, to properly diagnose the operation of an electrical machine, data readings from the sensor set of FIG. 2C should be taken at the typical load of the machine. Determining the load characteristics of the machine allows for the determination of this typical load. Second, the load characteristics of a machine can provide insight into the electrical consumption of the machine for energy management purposes and may allow for analysis of an unknown load.

Figures 1, 12:
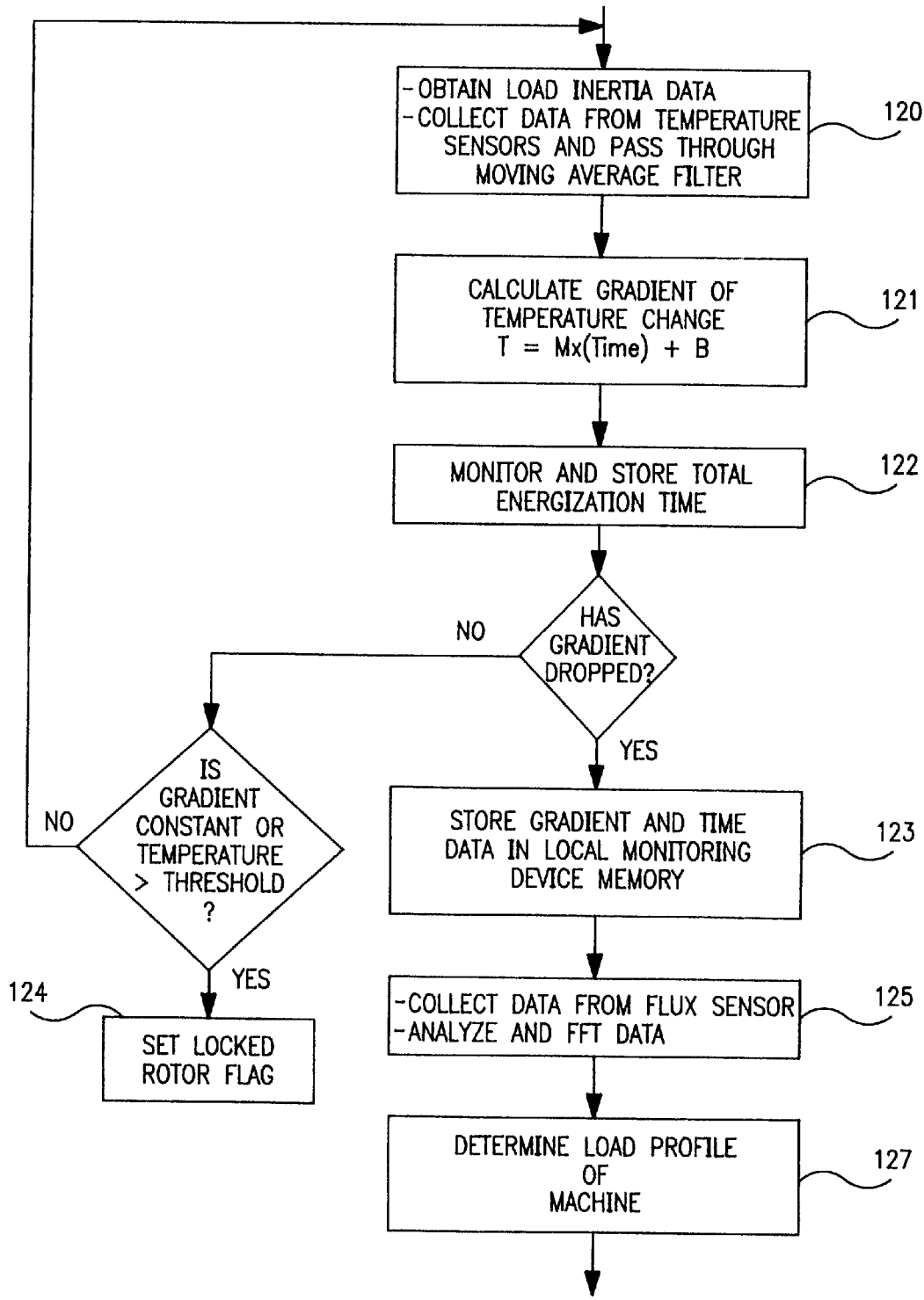
FIG. 12 illustrates the operation of a local monitoring device constructed in accordance with certain aspects of the present invention in a learning mode.
Figures 2, 12:
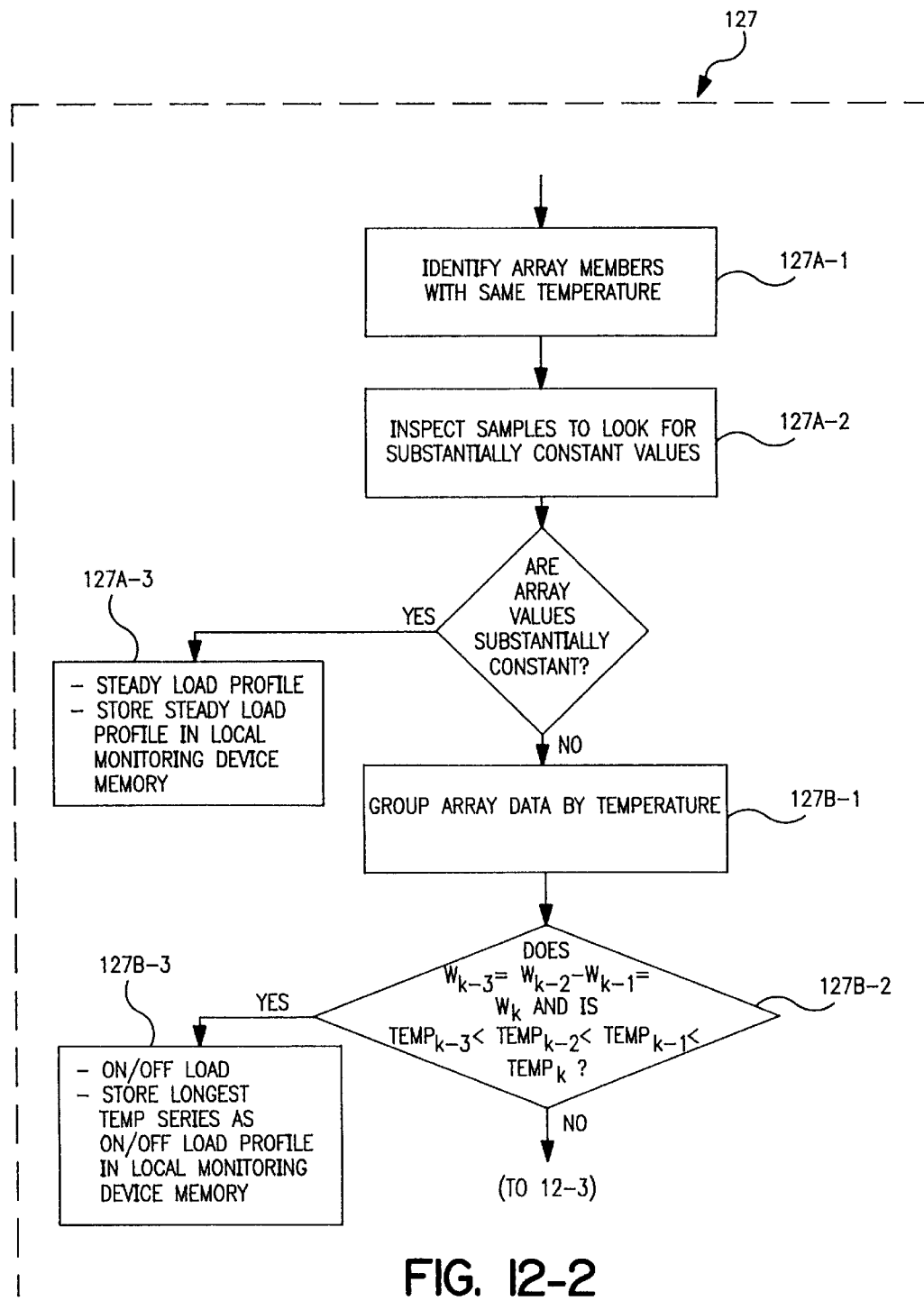
Figures 3, 12:
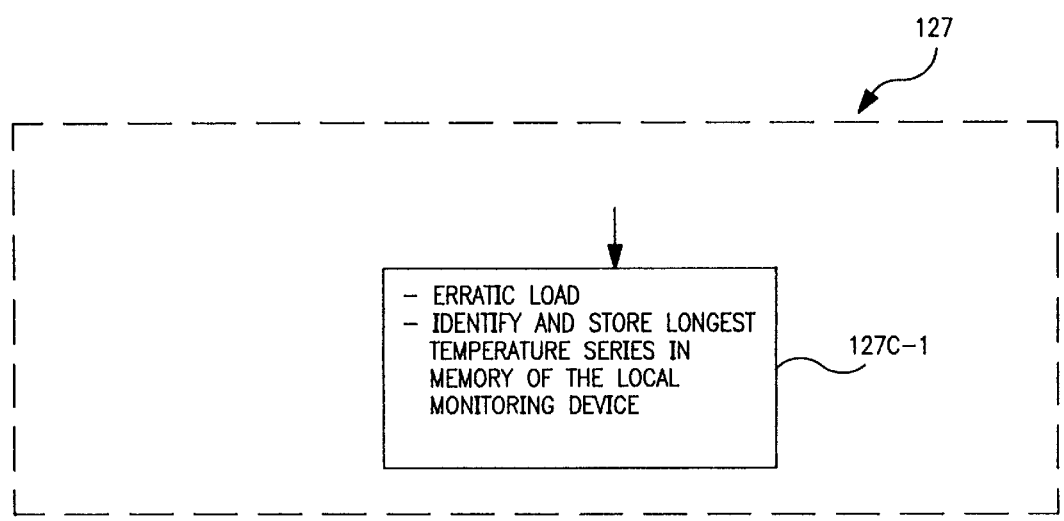

FIG. 12 generally illustrates the operation of the local monitoring device in the "Learning Mode." Once the local monitoring device is placed into the learning mode, it will first attempt to determine the inertia of the load coupled to the electrical machine associated with the local monitoring device. Once obtained, this load inertia data may be used to diagnose the operation of the electrical machine.

The load inertia is obtained at step 120 upon initial start-up of the machine. In that step, the local monitoring device collects data from the various temperature sensors on a periodic basis (e.g., once every $\frac{1}{100}$th of a second) and stores the collected temperature data into an array after first passing it through a moving average filter (e.g., Temp(k)= (Temp(k−1)+temp (K)+temp+1))/3). The data from the temperature array is then analyzed after 10 points are collected and a curve fitting process is used to produce a linear equation that describes the collected temperature data over the ten points in terms of Temperature=$M_x$*time+b. Where $M_x$ corresponds to the gradient over the ten collected points at Step 121. Once ten points are obtained, the gradient over the past ten points is constantly calculated for each new point. An average gradient value is obtained as the running average of all gradients.

While the temperature values are being calculated and the temperature gradients are being calculated, the total time since energization is being monitored at Step 122. It is assumed that, as the machine accelerates the load, the gradient of the temperature change in the machine will continuously increase. Once the load is accelerated to the desired rotational speed, it is assumed that the temperature gradient will drop. Once the average gradient value drops, the initial lower value of the lower temperature gradient and the total time spent to accelerate the load to this value will be stored in the temporary memory of the local monitoring device at Step 123. If the gradient does not change or if the absolute temperature exceeds a predetermined threshold (e.g., 135° C.) the local monitoring device may assume that the motor is in a locked rotor condition and set an appropriate alarm flag at Step 124.

Once the monitoring of the temperature gradient indicates that the machine has appropriately accelerated the load, the local monitoring device will then collect a significant number of samples (e.g., 4096) from the flux sensor at Step 125. This collected flux data may then be passed through a Hanning window and the resultant data may be subjected to a FFT. The largest peak in the FFT spectrum between 0 and 120 Hz. may be identified and stored in the memory of the local monitoring device—as this value will correspond to the frequency of the power line used to power the electrical machine at Step 126.

Once the initial load inertia data is obtained and stored by the local monitoring device, the local monitoring device will proceed to Step 127 wherein it will determine the load profile of the electric machine. As discussed above, for typical electrical machines, the load profile will either correspond to a steady load, an ON/OFF load or an erratic load. The ability of the monitoring device to accurately determine the load profile of an electrical machine is one of the key unique features of the device.

In the steps above, the local monitoring device will collect select data from the sensor set over an extended period of time. In one method, the local monitoring device will generate a temperature array that is updated every ten minutes for the first 100 hours of machine operation. Each time the temperature array is updated, the local monitoring device will monitor the winding and bearing temperatures by obtaining the output values of the appropriate temperature sensors at a rate of, e.g., 10 samples per second. A temperature reading will be obtained at a running average of three samples as described above. The temperature readings will then be normalized using ambient temperature readings as described above. The first normalized temperature reading will be stored in temporary memory. Data from the flux sensor will be taken upon determination of a temperature reading and the peak power will be obtained through an analysis of the flux data. Data from the vibration sensor will be detected and, using the techniques described above, the rotational speed of the machine will be determined. The data couplet of the time of the reading (k), the temperature reading (which is a running average at time k), and the rotational speed will be written into one point of the array. This process will be repeated until the array is populated with a statistically large number of data couplets (e.g., 1,000 couplets).

Once the array is populated with the appropriate number of time/temperature/rotational speed couplets, the array may be analyzed by the local monitoring device to determine the load profile of the electric machine. The method for determining the load profile is illustrated in FIG. 12, Step 127.

Referring to Step 127A, the local monitoring device will first attempt to whether the load profile of the machine is a steady load as that is the most easily identifiable load profile. The local monitoring device will first identify all members of the array that have temperature values within a given amount (e.g., two degrees) of one another at Step 127A-1. The identified members are then candidates for a steady load profile. If the number of array members in the identified category is larger or equal to three, it will be necessary to determine whether the load is steady or erratic. This determination is made by inspecting the other parameter of each time/temperature/speed couplet at Step 127A-2. Assume that there are a select number of samples (Tk, Tk+1, Tk+2 . . . ) that have temperature readings within the predefined range (e.g., ±2 C). If the speeds for these select samples are substantially constant, then the identified members of the array correspond to a steady load condition. This can be determined by comparing the speed values for the identified samples. If the speed values are all within a given amount (e.g., 5 RPMs), then a potential candidate for a steady load has been identified. The remaining members of the array are compared to the average of the select samples. If more than a given number (e.g. 30% or 300) have temperature data within 2 degrees of the average temperature of the select samples and speed data within 5 RPMs of the average speed of the select samples, then the load may be characterized as steady. A baseline load profile may then be created and stored in the flash memory associated with the local monitoring device by storing the time/speed/temperature couplets that have temperature data within 2 degrees of the average temperature of the select samples and speed data within 5 RPMs of the average speed of the select samples at Step 127A-3. For electric machines having steady loads, the average temperature and average speed data may be used as baseline data for later diagnosis of the machine. Such baseline data may be written into the flash memory of the local monitoring device.

If the local monitoring device determines that fewer than 30% of the array couplets have temperature data within 2 degrees of the average temperature of the select samples and speed data within 5 RPMs of the average speed of the select samples, then the load profile for the electrical machine is either erratic or ON/OFF. To determine whether the load is ON/OFF or erratic, the array couplets are first grouped by the local monitoring device into groupings having substantially the same temperature reading at Step 127B-1. For example, for one set of array data temperature groupings of tk, tm and tn may exist, the local monitoring device will then select one of the array couplets within a temperature grouping that was taken at a time k and compare it to the array readings that were taken at times immediately preceding the selected couplet (e.g., k−1, k−2, k−3) at Step 127B-2. If for more than 30% of the couplets in the array the following rule can be established, then the load can be characterized as an ON/OFF load: speed at k−3=speed at k−2=speed at k−1= speed at k and temp at k−3<temp at k−2<temp at k−1<temp at k. If the load is neither steady nor ON/OFF, then the load is erratic.

When the load is ON/OFF, the baseline speed and temperature data for the machine may be identified by first arranging all of the couplets in the array into groupings having substantially the same temperate. The temperature grouping with the largest number of couplets may then be selected and, within that group, the couplets may be analyzed to determine whether a series exists where the couplets share substantially the same temperatures and substantially the same speeds. If more than one series is identified, then the longest series may be selected. The series may be used as the baseline data for the machine and written into the flash memory of the local monitoring device at Step 127B-3.

To identify baseline data for an electric machine having an erratic load profile, the time/speed/temperature couplets in the array are first organized into groups falling within a predetermined temperature range (e.g., groups of the same temperature or groups ±2 degrees of a given temperature) Step 127C-1. The temperature group with the largest number of candidates should be selected and, within the group, the approach discussed above in connection with the ON/OFF load may be used to identify an appropriate series for storage as the machine's baseline data.

Figure 13:
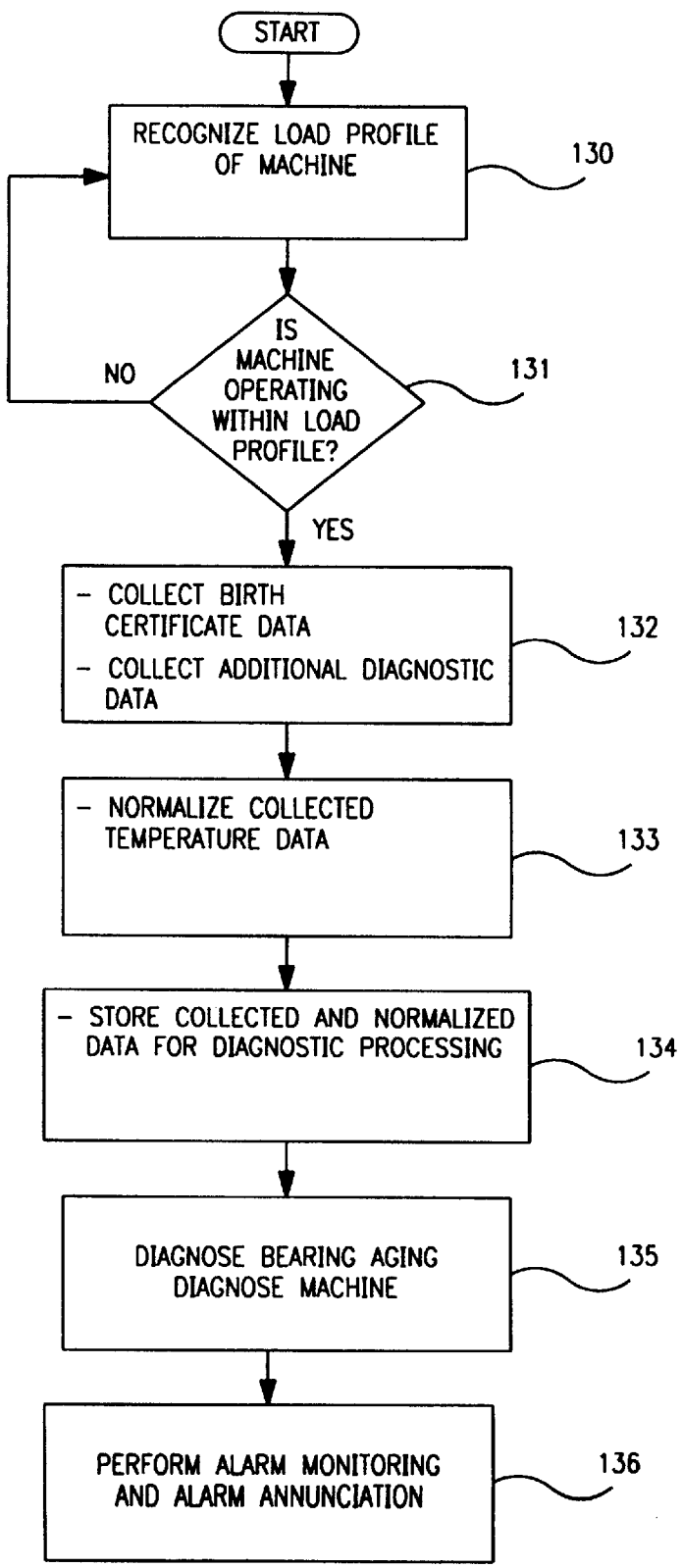
FIG. 13 illustrates the operation of a local monitoring device constructed according to various teachings of the present invention in a learning and diagnostics mode.

In addition to having the ability to identify the type of load associated with an electric machine, the local monitoring device of the present invention may also be used to perform life prediction and diagnostics on a machine. Such life prediction and diagnostics may take advantage of baseline data stored while the local monitoring device is in the learning mode. FIG. 13 illustrates the operation of the local monitoring device in the life prediction and diagnostics mode. In this mode, the local monitoring device provides full diagnosis features for the prediction of life.

FIG. 13 illustrates the operation of the local monitoring device in the life prediction and diagnosis mode for an electric machine whose load profile has already been either provided to the local monitoring device or determined by the local monitoring device in accordance with the methods described above. In Step 130, upon start-up, the local monitoring device will recognize from the data stored in its flash memory the operational mode of the machine (steady, ON/OFF, erratic) and the load profile.

Once this data is obtained, the local monitoring device will, in step 131, attempt to determine whether the motor is operating in its "stable" load condition that corresponds to the baseline load information written into the local monitoring device's flash memory in the "learning" mode. This is because, for diagnostic and life prediction purposes, it is beneficial to compare collected data and baseline data taken under approximately the same load conditions. In step 131, the local monitoring device identifies the stable load of the machine by attempting to recognize stable load conditions that include a temperature that is stable within 2 degrees of the baseline temperature data written into the flash memory and a speed that is within 5 RPMs of the baseline speed stored in the flash memory.

Once a stable and recognized load condition is identified, the local monitoring device will collect the data previously collected in the birth certificate mode in Step 132. Reference should be made to the description of the birth certificate mode for a description of such data. In one embodiment, the birth certificate data is collected a number of times by the local monitoring device (e.g., 5), averaged, and recorded in the memory of the local monitoring device for later analysis or provision to an external device (e.g., a PC) via the communications board for the local monitoring device.

Following the collection of the birth certificate data in step 132, the local monitoring device will collect other data useful for diagnostics and life prediction. In particular, in Step 132, the local monitoring device may collect a variety of data for diagnostics including data relating to the rotational speed of the machine and data from the flux detector. As described above and in more detail below, the data from the flux detector may be particularly useful for life prediction purposes. As such, the local monitoring device may record the readings from the flux detector and process such data as set forth in step 132. First, the local monitoring device will perform an FFT on the flux data. From the FFT spectrum, the power supply frequency may be identified (as the highest peak) and an appropriate digital filter may be selected to filter out flux variations induced by the power supply. Once that is completed, the local monitoring device can collect and store: (i) 3x, 4x, 5x, 6x, 7x, 8x, 9x and 10x from the original spectrum, (ii) 1x and 2x rotational data from the original spectrum; and (iii) 1x and 2x data for the power supply frequency.

In addition to collecting flux data in step 132, the local monitoring device may collect, process, and store data from the vibration sensor as follows: (i) a decimation of the raw vibration data; (ii) data relating to vibration power (for, e.g., 300–400 Hz., 400–500 Hz., 600–700 Hz., 800–900 Hz., 900–1000 Hz, 1000–1100 Hz., 1100–1200 Hz. and the ball, inner race and outer race frequencies). From this data and the flux data, the following data is generated by the local monitoring device and stored in the memory of the device: 1X, 2X, 3X, 4X, 5X, 6X, 7X, 8X, 9X and frequency band data and side band peaks based on the rotational speed of the machine.

In step 133, the temperature data collected in step 132 is normalized using the general equation: Tnorm=Tcalc−(Tmeasured−Tambient). The measured and ambient temperature readings are obtained from the temperature sensors coupled to the local monitoring device. The calculated temperature is determined as follows. First, the speed of the machine is determined using a speed sensor or the techniques described above. Second, the voltage applied to the machine is determined using a voltage sensor. Then, using a polynomial that described the torque as a function of the voltage and measured speed, the torque of the machine may be determined. The selection of such a polynomial will vary from machine to machine, but will be within the ability of one of ordinary skill in the art having the benefit of this disclosure. From the calculated torque, the losses of the machine may be determined and, based on the calculated losses, the temperature Tcalc may be determined.

In step 134, the data collected in step 132 and normalized in step 133 is stored in the local monitoring device for either: (i) processing by a diagnostic routine running on the local monitoring device or (ii) submission to a personal computer or other higher level device for processing. The data that will be used for diagnostic and life prediction evaluation will be a series of points collected in the time frame that are temperature dependent. The data may be segregated into two categories. One set of data may be used for predicting the end life of the bearings and the other set may be used to predict the end life of the insulation. For both types of failure analysis, a "time expansion factor" may be determined by the device performing the diagnostic operation.

In step 135, the life expectancy of or aging of the bearings is calculated either by the local monitoring device or a data processor that receives data from the local monitoring device. The bearing aging is determined using the difference between the sensed bearing temperature and the ambient temperature because such temperatures are relatively robust to factors external to motor operation. The value of bearing temperature is a function of ambient temperature, heat generation within the bearings and the effect of heating from the windings. By considering ambient temperature the effect of local bearing heating becomes the dominant factor affecting the feature value. The result of the life calculation may be used to set an alarm or change the status of an indicator reflecting the state of the machine as described above.

According to one embodiment of the present invention, before calculating the anticipated bearing life, the local monitoring device—or the other processor analyzing the collected machine data—will calculate a "time expansion factor" determined from past tests on similar bearings. For example, assume that accelerated aging tests for a particular bearing show that the bearing lubricant lasted 600 hours at a temperature of 140° C. If the average temperature of the machine under test is different than 140° C., e.g., 60° C., it is possible through the use of a "time expansion factor" to determine not only how long the lubricant will last at 60° C., but also to determine how often the bearing temperature should be sampled and how to analyze the sensed data. This approach does not rely on any complicated conversion factors, but instead relies on controlling the sampling of the machine's temperature data.

Figure 14:
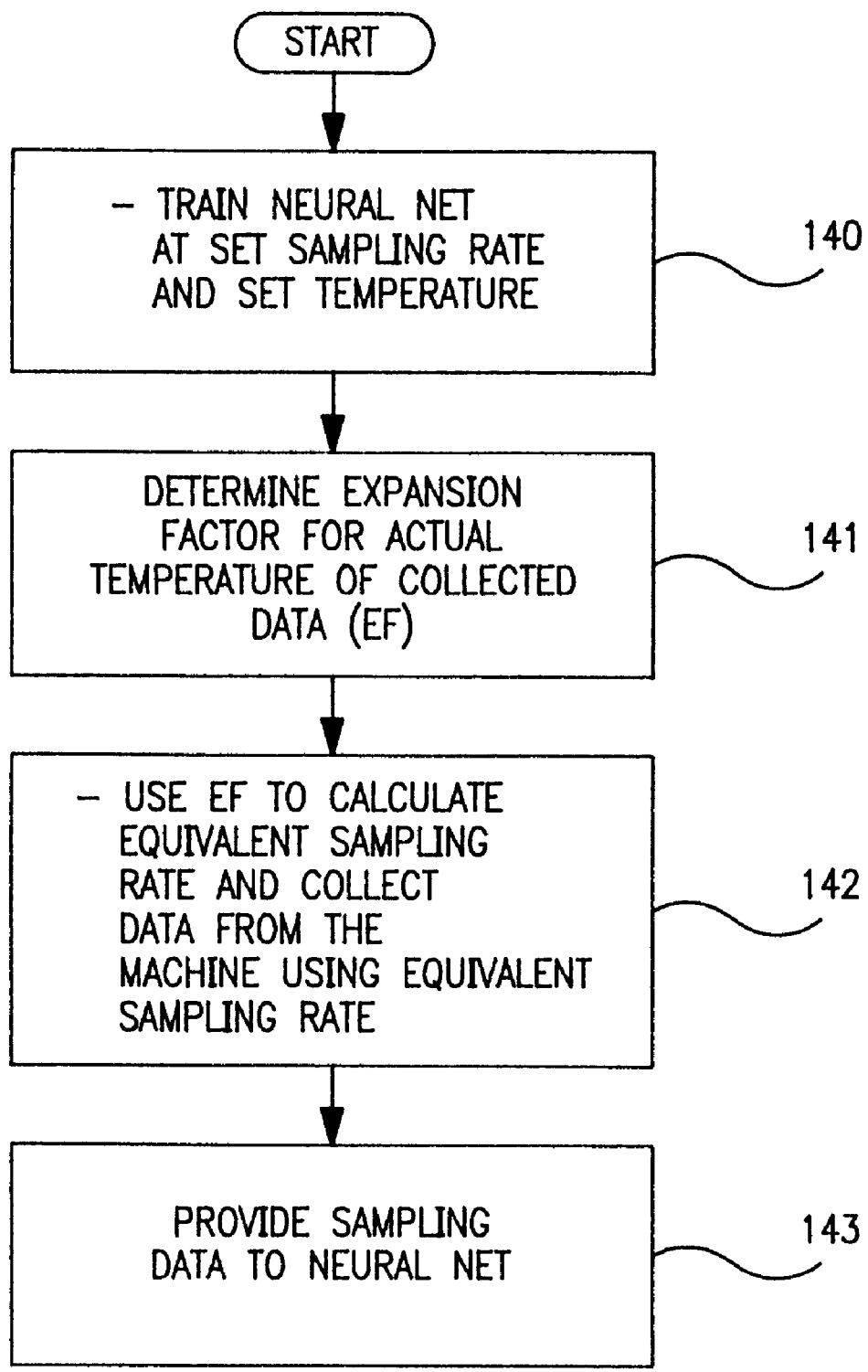
FIG. 14 generally illustrates the use of time expansion factors in accordance with one method of the present invention.

FIG. 14 generally illustrates one approach for utilizing time factor expansion as described above. Referring to FIG. 14, a neural network for predicting bearing failure is first trained using known techniques and the methods described above and bearing failure data taken at a set sampling rate and temperature (e.g., at 140° C. and one sample per hour), in Step 140. In the illustrated example, it is assumed that the bearings failed after 10 aging cycles, with each cycle taking four days. It is further assumed that readings from the sensors are taken every hour. Through calculation, experimentation, or through the use of another neural network system, it is possible to determine that one hour of aging at 140° C. is equivalent to EF hours of aging at 60° C., where EF is the time expansion factor. This is performed at Step 141. Through the use of this expansion factor EF, it is possible to control the sampling of data from the electric machine at 60° C. such that the data can be used with the neural network without the use of complex conversion formulas.

To determine how often data must be sampled at 60° C. to be equivalent to data sampled hourly at 140° C., it is first necessary to determine the total number of hours for each aging cycle used to train the neural network. In the illustrated example, each aging cycle is equal to six days of 6*24=144 hours. Thus, converting this to hours in the reference temperature frame of the electric machine, each cycle will be EF*144 hours.

When the bearing failure neural network is trained, it may be trained using linear/piecewise interpolation between two aging/testing cycles and the number of training sets inserted between each adjacent training set will be a given number (in this example 5). Thus, when trained, neural network will need data from at least five aging cycles to properly access bearing aging. To obtain data for five such cycles at 60° C., the bearing temperature should be sampled every EF*144/5 hours at Step 142. The sampled data is provided to the bearing failure neural network that was trained at Step 143 at 140° C. and the output of the network is used to access bearing aging. Once the appropriate number of samples are acquired, the bearing failure neural network will accurately provide bearing failure information for the machine at 60° C.

It should be noted that the above method uses the same neural network that was trained with 160° C. data to perform bearing failure without using any conversion factors to convert the detected temperature data. Instead, the rate at which the data is sampled and provided to the neural network is controlled using a time expansion factor, EF. This novel method allows the use of neural networks trained at one temperature to accurately diagnose a machine operating at a different temperature without changing the parameters of the neural network or performing complicated conversion operations on the detected data.

While the example illustrated in FIG. 14 illustrates the use of a time expansion factor and a neural network to monitor bearing aging, the same approach may be used to monitor and obtain life estimates for the stator. If such an approach is used, the average stator winding temperature may first be determined. Second, an appropriate EF factor may be calculated based on the difference between the average winding temperature and the temperature at which the stator failure neural network was trained. Third, using the process described above, the sampling rate may be calculated. Finally, the data may be sampled according to the calculated sampling rate and provided to the neural network for analysis.

Referring back to FIG. 13, once the data has been collected from the machine and analyzed by the appropriate neural networks or stored for later analysis, the local monitoring device may set one or more flags depending on the status of the machine. This "alarm annunciation" is accomplished at Step 136. While the exact nature of the alarms to be identified will vary from machine to machine, typical alarm conditions include: (i) winding temperature too high (when winding temperature exceeds predetermined maximum value (e.g., 130° C.); (ii) bearing temperature too high (when bearing temperature exceeds predetermined maximum value (e.g., 130° C.); (iii) excess vibration (when the vibration exceeds the baseline vibration determined in the birth certificate mode by more than a given amount (e.g., 30%)); and (iv) excess flux (when the flux exceeds the baseline flux determined in the birth certificate mode by more than a given amount (e.g., 30%)).

While the above example discusses the use of temperature sensor data to predict bearing or stator failure, it has been found that reliance upon data from a single source or sensor can result in potentially erroneous conclusions. In accordance with one embodiment of the present invention, the neural networks are used to perform machine diagnostics and such networks are trained and operate on inputs from a plurality of sensors of the type discussed above in connection with FIG. 2C.

Although some success has been achieved in developing residual life predictors using data just from one source, the vibration feature, the most robust results are achieved by fusing thermal and vibration data with the prediction process. In this approach, the aging neural network is presented with vector inputs which are not just time delayed vibration-based feature values but also time delayed temperature-based features. Under this approach, the neural networks described above will not utilize temperature data only but will also operate on vibration data from the vibration sensor.

In accordance with another embodiment of the present invention, the data from multiple sensors is used to monitor machine aging in a formalized manner using a Hilbert space formulation. Effectively, this approach detects resonance between appropriate peaks in the Fourier transform of data collected from different sensors, e.g., the flux and accelerometer sensors. The technique is described in the following seven steps, assuming the case of two sensors embedded in the motor:

1. Collected data from motor flux and accelerometer sensors, $x_1=[x_1(1),x_1(2),K]$ and $x_2=[x_2(1),x_2(2),K]$.
2. Apply Fourier transform (3) to $x_1$ and $x_2$ to obtain $X_1$ and $X_2$ correspondingly.
3. At each frequency calculate the correlation matrix between the two spectra, $$A(\omega) = \begin{pmatrix} X_1^+(\omega)X_1(\omega) & X_1^+(\omega)X_2(\omega) \\ X_2^+(\omega)X_1(\omega) & X_2^+(\omega)X_2(\omega) \end{pmatrix},$$

where $\alpha^+$ is the transpose of the complex conjugate of $\alpha$.
4. Calculate the eigenvectors $e_1(\omega)$ and $e_2(\omega)$ of $A(\omega)$, a Hermitian matrix, for all $\omega$.
5. Calculate the signal vector, $\xi(\omega)=[X_1(\omega),X_2(\omega)]$, at each $\omega$.
6. Multiplying the complex conjugate of an eigenvector with the observation vector and the eigenvector. There will be one output for each sensor.
7. The complex number output of step six is used in creating a Nyquist plot, the axis being the real and imaginary components, respectively.

The resultant plots are open to classical analysis using Kennedy-Pancu modal analysis methods. Such plots can also be used in conjunction with neural networks to predict residual life. If used in conjunction with neural networks, it would be the pulsing and motion of the modal circles which would be the feature tracked. Typically, a multiple feature detection algorithm such as the Hough Transform would be used to extract data about the circles which, in turn, is fed into the neural network, such as circle center co-ordinates and radii.

The above description of several embodiments is made by way of example and not for purposes of limitation. The present invention is intended to be limited only by the spirit and scope of the following claims.

I claim as my invention:

1. A distributed diagnostic system for monitoring a plurality of machines, the system comprising:
   a plurality of local monitoring devices, each local monitoring device having:
      sensors for collecting local data concerning at least one machine associated with the local monitoring device;
      a local data processor for receiving and communicating the local data from the sensors concerning its associated machine;
   a centralized data processor coupled to the plurality of local monitoring devices, the centralized data processor for receiving from each local monitoring device the local data concerning its associated machine, for generating a set of weighting parameters for each local monitoring device, and for communicating the set of weighting parameters to each local monitoring device; and
   the local data processor of each local monitoring device further for receiving the set of weighting parameters, and analyzing the local data using the set of weighting parameters for local diagnostic purposes.

2. An apparatus for locally monitoring a rotating electric machine for diagnostic purposes, the apparatus comprising:

a set of sensors positioned with respect to the rotating electric machine to provide sensor information indicative of the operation of the rotating electric machine, at least one sensor of the set of sensors being an environmental sensor for providing environmental information indicative of an environmental condition of the machine;

load determination means for generating machine load information indicative of a machine load; and a programmed processor for receiving the sensor information from the set of sensors, normalizing the sensor information based on the machine load information and the environmental information to provide normalized information that is independent of the machine load and the environmental condition of the machine, and for processing the normalized information to provide an output signal indicative of the diagnostic condition of the rotating electric machine.

3. The apparatus of claim 2 further comprising a communication link, and a communication board electrically coupled to the programmed processor and to the communication link, the communication board being adapted to communicate information and data over the communication link.

4. The apparatus of claim 2 further including a visual indicator electrically coupled to the processor for receiving the output signal generated by the processor, and for providing a visual indication of the diagnostic condition of the rotating electric machine based on the output signal.

5. The apparatus of claim 2 wherein the rotating electric machine includes at least one bearing structure and a phase winding and wherein the set of sensors includes:

at least one sensor positioned to provide an electrical signal corresponding to the temperature of the bearing structure;

at least one sensor positioned to provide an electrical signal corresponding to the temperature of the phase winding; and at least one sensor positioned to provide an electrical signal corresponding to the temperature of the environment in which the rotating electric machine is operating.

6. The apparatus of claim 5 wherein the set of sensors includes at least one flux sensor that is positioned to provide an electrical signal corresponding to the magnitude of the electric flux existing in the rotating electric machine.

7. The apparatus of claim 5 wherein the rotating electric machine includes at least one endshield structure for holding the at least one bearing assembly and wherein the at least one temperature sensor is embedded in the endshield.

8. The apparatus of claim 6 wherein the at least one flux sensor includes a magnetoresistive circuit.

9. An apparatus for locally monitoring a rotating electric machine for diagnostic purposes, wherein the rotating electric machine includes an insulated phase winding, the apparatus comprising:

a programmed processor; and a set of sensors having outputs coupled to the programmed processor, each sensor being positioned with respect to the rotating electric machine to provide output information at each output concerning the operation of the rotating electric machine, the set of sensors including an insulation failure sensor comprising:

a conductive element having a first end and an uninsulated conductive portion that is wound about a portion of the insulated phase winding; and a detection circuit coupled to the first end of the conductive element for detecting the presence of an electrical connection between the uninsulated conductive portion and the portion of the insulated winding, thereby detecting an insulation failure, wherein the programmed processor (i) receives the output information from the set of sensors and normalizes the output information to provide normalized information that is independent of the machine load or the environmental conditions in which the machine operates, and (ii) processes the normalized information to provide an output signal indicative of the diagnostic condition of the rotating electric machine.

10. An apparatus for locally monitoring a rotating electric machine for diagnostic purposes, wherein the rotating electric machine includes at least one bearing structure and a phase winding, the apparatus comprising:

a programmed processor; and a set of sensors having outputs coupled to the programmed processor, each sensor being positioned with respect to the rotating electric machine to provide output information at each output concerning the operation of the rotating electric machine, the set of sensors including:

at least one sensor positioned to provide an electrical signal corresponding to an ambient temperature of the bearing structure;

at least one sensor positioned to provide an electrical signal corresponding to a temperature of the phase winding; and at least one sensor positioned to provide an electrical signal corresponding to a temperature of the environment in which the rotating electric machine is operating, wherein the programmed processor (i) receives the output information from the set of sensors and normalizes the output information to provide normalized information that is independent of the machine load or the environmental conditions in which the machine operates, and (ii) processes the normalized information to provide an output signal indicative of the diagnostic condition of the rotating electric machine, and wherein the programmed processor normalizes the bearing structure and phase winding temperature information to provide normalized temperature information that is independent of the machine load or the environmental conditions in which the machine operates, in accordance with the following equation:

$$T_N = (T_{sensor} - T_{ambient})/L$$

where, $T_N$, represents the normalized temperature information; $T_{sensor}$ represents the raw temperature reading from the appropriate sensor; $T_{ambient}$ represents the ambient temperature of the environment; and L represents the machine load.

11. Apparatus for producing an electrical signal indicative of the rotational speed frequency of the rotor of an induction machine comprising:

a flux sensor positioned to provide an output signal that corresponds to the flux in the induction machine;

a comparator having an output, a first input and a second input, the first input receiving a reference voltage signal and the second input receiving the output of the flux sensor, the comparator producing at its output a signal having a first logic state whenever the voltage at the first input is greater than the voltage at the second input and a second logic state whenever the voltage at the second input is greater than the voltage at the first input; and means coupled to the output of the comparator for producing an electrical signal corresponding to the frequency at which the output of the comparator changes states, wherein the electrical signal is indicative of the rotational frequency of the rotor.

12. A method of determining the slip of an induction machine having a rotor and a stator, the rotor defining a rotational frequency and the stator defining a synchronous frequency, the method comprising the steps of:

monitoring the flux passing through a portion of the induction machine and providing an electrical signal corresponding to the flux;

deriving a first digital signal corresponding to the frequency at which the electric signal corresponding to the flux varies from above a predetermined value to below the predetermined value, the first digital signal corresponding to the rotational frequency of the rotor;

determining the major frequency component of the electrical signal corresponding to the flux and deriving a second digital signal corresponding to the major frequency component, the second digital signal corresponding to the synchronous stator frequency; and determining the slip S of the induction machine in accordance with the following equation:

$$S=(f(s)-f(r))/f(s)$$

where f(r) is the rotational frequency of the rotor, and f(s) is the synchronous stator frequency.

13. A monitoring device for use in monitoring an electric machine, the monitoring device comprising:

a programmed processor; and a set of sensors having outputs coupled to the programmed processor, each sensor being positioned with respect to the electric machine to provide information at its output concerning the operation of the electric machine;

means operatively associated with the programmed processor for operating the processor in a birth certificate mode wherein the outputs of the sensors are processed by the programmed processor and stored as baseline operational parameters;

means associated with the programmed processor for operating the device in a monitoring mode, after the programmed processor has been operated in the birth certificate mode, wherein the programmed processor processes the outputs from the sensors, compares the processed outputs to the baseline operational parameters, and provides an indication of the diagnostic condition of the electric machine based on the comparison.

14. The device of claim 13 wherein the sensor set includes a vibration sensor and the baseline operational parameters include: (i) the vibration sensor mean; (ii) the vibration sensor variance; (iii) the vibration sensor range; (iv) the overall vibration characteristics of the machine; and (v) predefined characteristic vibration spectrum frequencies of the machine.

15. The device of claim 13 wherein the sensor set includes an accelerometer for measuring the acceleration of the electric machine, a voltage sensor for sensing the electric voltage applied to the electric machine, and a temperature for sensing the temperature of at least a portion of the machine.

16. The device of claim 13 further including a flash memory device coupled to the programmed processor for storing the baseline operating parameters.

17. The device of claim 13 further including means associated with the programmed processor for operating the device in a learning mode to determine the typical load associated with the electrical machine and wherein the means for operating the device in the monitoring mode provides an indication of the diagnostic condition of the electric machine based at least partially on the typical load.

18. A method of determining the load characteristics of an electric machine, the method comprising the steps of:

using an electrical sensor set to periodically monitor the temperature of at least a portion of the electric machine and the rotational speed of the electric machine at given points in time over a first extended period and, for each point in time, storing in a digital memory a data couplet containing information concerning the temperature, the rotational speed, and the point in time;

using a digital processor to identify couplets having temperature values within a predetermined temperature range; and providing an indication of a steady state load if the temperature readings for at least a first predetermined number of couplets are within a first predetermined temperature range and the speed readings for the at least a first predetermined number of couplets are within a first predetermined speed range; or providing an indication of an ON/OFF load if, for at least a second number of couplets, the following condition is true:

speed at k−3=speed at k−2=speed at k−1=speed at k and temp at k−3<temp at k−2<temp at k−1<temp at k, where k corresponds to the time of the couplet, and k−x corresponds to the time of the xth preceding couplet.

* * * * *